US008635310B2

(12) United States Patent
Bartholomay et al.

(10) Patent No.: US 8,635,310 B2
(45) Date of Patent: *Jan. 21, 2014

(54) BUSINESS PROCESS UTILIZING SYSTEMS, DEVICES AND METHODS ENGENDERING COOPERATION AMONG SERVICE PROVIDERS TO MAXIMIZE END USER SATISFACTION

(76) Inventors: William G. Bartholomay, Orange, CT (US); Sin-Min Chang, Shelton, CT (US); Santanu Das, Monroe, CT (US); Arun Sengupta, Fairfield, CT (US)

( * ) Notice: Subject to any disclaimer, the term of this patent is extended or adjusted under 35 U.S.C. 154(b) by 623 days.

This patent is subject to a terminal disclaimer.

(21) Appl. No.: 12/853,146

(22) Filed: Aug. 9, 2010

(65) Prior Publication Data
US 2012/0016974 A1    Jan. 19, 2012

Related U.S. Application Data

(63) Continuation-in-part of application No. 12/835,963, filed on Jul. 14, 2010, now Pat. No. 8,027,937.

(60) Provisional application No. 61/364,165, filed on Jul. 14, 2010.

(51) Int. Cl.
*G06F 15/177* (2006.01)

(52) U.S. Cl.
USPC .......................................... 709/221; 709/220

(58) Field of Classification Search
USPC .................................................. 709/221, 220
See application file for complete search history.

(56) References Cited

U.S. PATENT DOCUMENTS

| 6,930,598 | B2 | 8/2005 | Weiss |
| 2008/0165789 | A1* | 7/2008 | Ansari et al. ................. 370/401 |
| 2008/0168523 | A1 | 7/2008 | Ansari et al. |
| 2008/0189774 | A1 | 8/2008 | Ansari et al. |
| 2009/0037382 | A1 | 2/2009 | Ansari et al. |
| 2010/0071053 | A1 | 3/2010 | Ansari et al. |
| 2010/0161627 | A1* | 6/2010 | Vossen et al. ................. 707/755 |

OTHER PUBLICATIONS

Market Overview Consumer http://www.openpeak.com/MarketOverview.php.
Market Overview Enterprise http://www.openpeak.com/MarketOverview.php.
Open Services Overview http://www.openpeak.com/OpenServices.php.
Open Services Features http://www.openpeak.com/OpenServices.php.
Set-top Integration Overview http://www.openpeak.com/SettopIntegration.php.
Set-top Integration Features http://www.openpeak.com/SetopIntegration.php.

* cited by examiner

*Primary Examiner* — Dustin Nguyen
*Assistant Examiner* — Joel Mesa
(74) *Attorney, Agent, or Firm* — Atanu Das; Techlaw LLP

(57) ABSTRACT

Methods, systems, and devices for providing a plurality of services to premises over one or more communication networks and providing one or more advertisements over a plurality of service virtual networks as well as business process associated such methods, systems, and devices are disclosed. Systems and devices may include a primary server, one or more secure access nodes and a secondary server that supports one or more services to one or more end point devices. Business process associated with such services may include revenue sharing for providing such services as well as commissions and transactions fees. Particular service may also include providing cross-service functional data, targeted advertising and targeted e-commerce services.

22 Claims, 32 Drawing Sheets

BUSINESS PROCESS UTILIZING SYSTEMS, DEVICES AND METHODS ENGENDERING COOPERATION AMONG SERVICE PROVIDERS TO MAXIMIZE END USER SATISFACTION

CROSS-REFERENCE TO RELATED APPLICATIONS

The present application claims priority under the laws and rules of the United States, including 35 USC §120, to U.S. patent application Ser. No. 12/835,963 filed on Jul. 14, 2010 and claims priority under the laws and rules of the United States, including 35 USC §120, to U.S. Provisional Patent Application No. 61/364,165 filed on Jul. 14, 2010. The contents of U.S. patent application Ser. No. 12/835,963 and U.S. Provisional Patent Application No. 61/364,165 are herein incorporated by reference.

BACKGROUND

An individual using a computer, Smartphone, or gaming system may subscribe to multiple services from across the Internet to enhance the individual's quality of life or increase efficiency in work. Examples of such services may include controlling banking and financial activity, conducting e-commerce, managing premise security and energy consumption, Internet gaming as well as other services. Alternatively, businesses using computers and other electronic equipment may also subscribe to multiple services from across the Internet including managing business content, controlling financial transactions, office security, energy consumption as well as other services. Many of these services may require the consumer (e.g. an individual at home or an employee of a business) to initiate a virtual network between a terminal network device having client service software application and a service provider server to control and manage the virtual network. Thus, either terminal network device or service provider server or both must maintain the service virtual network. Such a scheme of generating a service virtual network may be inefficient in using network resources as well as expensive in both time and cost to implement such virtual network management and control features into each terminal network device or each service provider server.

In addition, terminal devices such as computers, set-top boxes, and gaming systems may be able to provide user behavioral information, analytical information as well as other service data to primary and secondary service providers such as Cable TV operators, e-commerce providers, and gaming providers. However, traditional network architectures may have limited or may not be capable of providing such data to the service providers in an efficient and secure fashion. Further, traditional network architectures do not provide ways to analyze and process such user behavioral and analytical information to provide cross-service function across a wide array of services. Also, due to lack of analyzing and processing such user behavioral and analytical information, business processes and revenue streams cannot be realized for providing additional services based on providing, analyzing, and processing the user behavioral and analytical information.

SUMMARY

An individual or a family at home is increasingly facing needs to subscribe to multiple services from service providers to enhance the individual's (or family's) quality of life, increase efficiency of work or enjoy enhanced safety or security. Business entities are also experiencing similar needs. Examples of such services may include conducting banking transactions, engaging in e-commerce, managing premises security, controlling energy consumption, gaming etc. The individuals at home or in business generally use a computer, a Smart phone, gaming system or any other electronic equipment to access the services or control the proper usage of such services. The service providers in many instances may need access to resources at home or business premises in order that they may provide services. For instance, in providing energy management services, access to energy consuming elements such as home appliances may be needed. To obtain access to resources on the premises, a terminal or end point device may need to be installed at the premises and the terminal device (end point device) may need a tethered or non-tethered connection to the controlled appliances. Note, terminal devices and end point devices may be used interchangeable throughout this disclosure. Different functions in the terminal device may be accessible by different service providers in a seamless and secure way. Further, one service provider may not be allowed to interfere with the workings or services of other service providers on the same terminal device. Each service provider may have required access to and control of elements (e.g. appliances, etc.) at home which are in the service provider's domain of access, but not in any other domain. Generally, service providers may deploy a server or server function hosted in a public server or Cloud computer to control functions at the premises that may access the elements at the premises through the terminal device at the premises. Consequently, there may be multiple virtual service networks in operation, each virtual service network comprising of a server controlled or managed by a service provider and a subset of functions in the terminal device, the subset functions providing access to the elements in the premises which are in the domain of the particular service (e.g. appliances, etc.). The connection between the servers controlled or managed by the service providers and the terminal device may be hard-wired, connected through the Internet or some other communication network that may include, but not limited to, a wireline network, a cable network or a wireless network. The connection between the terminal device at the premises and the elements (e.g. appliances, etc.) in the premises may be hard-wired, indirectly coupled, or coupled through a wireless network using WIFI or Zigbee or other wireless protocols. The present application discloses systems, devices and methods for generating and operating multiple virtual networks which are cost-effective, easy to administer and expand, and secure from third party interference as well as from cross service domain (cross virtual network) interference Traditionally, terminal network devices and/or service provider servers together form, control, and maintain specific virtual networks for the benefit of a community which requires access to a communication network for business or entertainment. Providing, generating and maintaining simultaneous multiple networks for multiple services may encompass the same set of clients (terminal or end point devices) such that different service providers may provide different services to the clients. Traditional implementation paradigms may be inefficient and expensive in providing, generating and maintaining simultaneous multiple networks for multiple services. The present application discloses systems, devices, and methods for providing multiple virtual networks for multiple services while maintaining or enhancing the level of security of traditional individual networks currently provide. The disclosed systems, devices, and methods generate such multiple secure virtual networks for providing different services controlled by different service providers by using intermediate network nodes which generate, control, and maintain virtual service networks for individual and business consumers. The intermediate nodes may be customer premises equipment or a server of a primary service provider (e.g. cable television or telephone service provider). The intermediate nodes may be controlled by the primary service provider and the intermediate nodes may ensure that other service providers have access to network resources controlled by the primary service provider in a specified and secure manner for the benefit of the end user community. While maintaining these multitudes of virtual service networks, the intermediate network nodes may inspect received data packets of different services and collect data and other information (e.g. time of day, etc.) from the received data packets. Consequently, the intermediate nodes may process the collected data to ensure and maintain segregation between services, increase security from third party intrusion into the virtual service networks, generate additional robust service features by analyzing data across different services, and may provide consumer behavioral data to enhance e-commerce activities including advertising if the user permits. Service segregation provides not only the ability of service providers to operate in separate domains, but also enables sharing of common facilities for regulated and non regulated services. In addition to the above-mentioned benefits, having virtual network management and control for multiple services implemented by intermediate nodes in a network such as several primary servers (e.g. primary service provider server) or several customer premises equipment, has the further advantages of having the virtual network management and control mechanism residing in only a few intermediate nodes rather than a comparatively larger number of terminal network devices (e.g. end point devices) and service providers servers (e.g. secondary servers).

One or more business processes are described that may utilizes systems, devices, and methods described herein for providing multiple services to premises over communication networks. Secondary service providers, whose services and systems (e.g. servers, etc.) may be layered on top of, or otherwise integrated into such previously mentioned systems, devices, and methods, may take advantage of not only a lower cost and more secure infrastructure for providing their specific service but also can take advantage of the trusted relationship that exists between the consumers and the primary service provider that controls the infrastructure. The business processes resulting from such an underlying architecture of systems, devices, and methods, provides an incentive for both the primary service provider and the one or more secondary service providers to cooperate in a mutually beneficial relationship. The cooperation may involve sharing information between participating service providers (primary as well as secondary) such that each service provider can gain a wider scope of information to better serve end users than would be only possible if each service provider had its own infrastructure.

For the increased benefit of the end user, information shared among the service providers may need to be shared as well with a system manufacturers whose systems, devices, and methods may be used in an architecture that allow the service providers to share the same infrastructure to provide various services. The system manufacturer can continuously improve the performance and the cost of the systems, devices, and methods, based on the availability of such information. Thus, expanding the domain of cooperation among the service providers to include the system manufacturer benefits the end user who as a result may experience better services from the service providers. Therefore, the architecture engenders a cooperative behavior.

Further, because the shared information contains some pertinent and some less useful data, the system manufacturer may need to provide and continuously enhance data mining and analytic functions and algorithms (that may include fuzzy algorithms) so that the shared information benefits the end user through improved performance of each of the services. For example, an alarm monitoring service that shares the system with an energy management service can provide a persistent door open status to the energy management service so that the end user can be alerted that energy is being wasted. Likewise, the energy management service can indicate a high energy consumption at an odd hour to the alarm monitoring service that might indicate a failure of a heating device that could lead to a fire. However, the energy management service may not want to use information from exterior motion detectors as these may not be meaningful with regard to energy consumption. Since such actions may be performed in real time, the end user would benefit from the above mentioned example by not wasting energy and by turning off the offending appliance before a fire starts. Such service enhancement would not be possible without information sharing unless each service provider were to duplicate the sensors and controls of the other service providers and support their own algorithms.

Based upon such systems, devices, and methods for providing multiple services to premises over communication networks and that the architecture may engender a cooperative behavior among the service providers along with the system manufacturer, a business model (e.g. one or more business processes) may be provided that incentivizes and compensates participating parties. The primary service provider may be compensated for providing the communications infrastructure to each of the secondary service providers which is typically based on each secondary service's use of the communications infrastructure. Thus, compensation can come in the form of revenue sharing from each of the service providers based on their monthly or annual subscription fees as well as additional revenues that the each service provider obtains from advertising, e-commerce, etc. Further, the compensation to the system manufacturer may be a portion of such revenue from the primary service provider based upon the analytical data that is generated by the systems, devices, and methods and may thus continuously improved upon for the purpose of further enhancing the end user experience. The above-mentioned business processes can co-exist with the usual license fee and annual maintenance fee used for most products.

Within the embodiments described below, an exemplary system for providing a plurality of services to premises over one or more communication networks is disclosed. The system may include one or more secure access nodes, each having one or more secure access node processors, one or more secure access node storage devices, and one or more secure access node software applications. Further, the system may also include a primary server coupled to the one or more secure access nodes over one or more wide area communication networks. The primary server may have one or more primary server processors, one or more primary server storage devices, and one or more primary server software applications to control one or more service virtual networks and to provide a set of services. Additionally, the one or more secure access node software applications and the one or more primary server software applications may: (i) generate the one or more service virtual networks such that each of the one or more service virtual networks provides at least one service; and (ii) transfers service data including operational data, end point device analytical query data and secure access node analytical query data, end point device analytical response data and secure access node analytical response data, and end point device reconfiguration data and secure access node reconfiguration data, between one or more end point device communication interfaces and one or more server communication interfaces. The one or more end point device communication interfaces and one or more server communication interfaces may be service one or more virtual network communication interfaces that may couple to the one or more service virtual networks.

Within the embodiments described below, an exemplary device for providing a plurality of services to premises over one or more communication networks is disclosed. The device may include a secure access node having one or more secure access node processors, one or more secure access node storage devices, and one or more secure access node software applications. The one or more secure access node software applications may: (i) logically couple the secure access node to one or more service virtual networks, each of the one or more service virtual networks may provide at least one service; and (ii) transfers service data including operational data, end point device analytical query data and secure access node analytical query data, end point device analytical response data and secure access node analytical response data, and end point device reconfiguration data and secure access node reconfiguration data between one or more end point device communication interfaces and one or more server communication interfaces. The one or more end point device communication interfaces and one or more server communication interfaces may be one or more service virtual network communication interfaces that may couple to the one or more service virtual networks.

Within the embodiments described below, an exemplary method for providing a plurality of services to premises over one or more communication networks is disclosed. The method may include generating one or more service virtual networks using one or more secure access node software applications and one or more primary server software applications. The one or more secure access node software applications may be stored in one or more secure access node storage devices and executed by one or more secure access node processors. Further, the one or more primary server software applications may be stored in one or more primary server storage devices of a primary server and executed by one or more primary server processors of the primary server. Additionally, each of the one or more service virtual networks may provide at least one service. Another step in the method may include transferring service data including operational data, end point device analytical query data and secure access node analytical query data, end point device analytical response data and secure access node analytical response data, and end point device reconfiguration data and secure access node reconfiguration data between one or more end point device communication interfaces and one or more server communication interfaces. The one or more end point device communication interfaces and one or more server communication interfaces may be one or more service virtual network communication interfaces that may couple to the one or more service virtual networks.

Within the embodiments described below, an exemplary device, such as a server (e.g. primary server or secondary server described herein), for providing one or more services over a service virtual network is disclosed. The device includes a service virtual network communication interface controlled by a service virtual network server function. The device may further include one or more processors coupled to the service virtual network communication interface, one or more storage devices coupled to the one or more processors, and one or more software applications stored in the one or more storage devices and executed by the one or more processors. Further, the one or more processors may execute the service virtual network server function The one or more software applications may be capable of: (i) providing operational data to a service virtual network communication interface; (ii) generating service analytical data; (iii) transmitting end point device analytical query data to the service virtual network communication interface, (iv) receiving end point device analytical response data from the service virtual network communication interface, and (v) receiving cross-service functional data and providing additional services based on the cross-service functional data. Additionally, the one or more software applications may process the end point device analytical response data, generate the end point device reconfiguration data based upon the end point device analytical response data and transmit end point device and secure access node reconfiguration data to the service virtual network communication interface.

Within the embodiments described below, an exemplary method for providing one or more services over a service virtual network is disclosed. The method may include providing operational data to a service virtual network communication interface using a device. The service virtual network communication interface may be coupled to the service virtual network and may be controlled by a service virtual network server function, such that one or more device processors may execute the service virtual network server function. Another step in the method may be generating service analytical data. A further step in the method may be querying for end point analytical information across a service virtual network communication interface based on the operational data and the service analytical data using one or more device software applications. The one or more device software applications stored in the one or more device storage devices of a device and executed by one or more device processors of the device. An additional step in the method may be receiving end point analytical information across the service virtual network communication interface using the one or more device software applications. Other steps in the method may be generating the end point reconfiguration information using the one or more device software applications based upon processing of the end point analytical information and transmitting the end point reconfiguration information to the service virtual network communication interface. Another step in the method may be receiving cross-service functional data and providing additional services based on the cross-service functional data. Further steps in the method may be processing the end point analytical information and the cross-service functional data and generating one or more advertisements based upon the processing of the end point analytical information. Additional steps in the method may be providing e-commerce services based upon the processing of the end point analytical information and cross-service functional data as well as providing additional services based upon the processing of the end point analytical information, secure access node analytical information, and cross-service functional data.

Within the embodiments described below, an exemplary system for providing one or more advertisements over a plurality of service virtual networks is disclosed. The system may include one or more service virtual network communication interfaces each service virtual network communication interface provides at least one service. The one or more service virtual network communication interfaces may be coupled to one or more service virtual networks and may include one or more end point device communication interfaces and one or more service communication interfaces. The one or more secure access nodes may have one or more secure access node processors, one more secure access node storage devices, and one or more secure access node software applications. The system may further include a primary server coupled to the secure access nodes over one or more wide area communication networks. The primary server may have one or more primary server processors, one or more primary server storage devices, and one or more primary server software applications to control the one or more service virtual networks and to provide a set of services. Further, the one or more secure access node software applications stored in the one or more secure access node storage devices and executed by the one or more secure access node processors and the one or more primary server software applications stored in the one or more primary server storage devices and executed by the one or more primary server processors. The one or more software applications and one or more primary server software applications may: collect a set of user data, analytical information and cross-service functional data from the one or more end point device communication interfaces, the set of user data and analytical information corresponds to user data for one or more services; (ii) provide user data and analytical information for the one or more services and the cross-service functional data to the one or more service communication interfaces; (iii) receive one or more advertisements from the one or more service communication interfaces; and (iv) transmit the one or more advertisements to the one or more end point communication interfaces. In addition, the one or more primary server software applications may manage the one or more advertisements based on the user data, analytical information, and cross-service functional data and generate one or more advertisements based on the user data, analytical information and cross-service functional data.

Within the embodiments described below, an exemplary device (e.g. primary server, secondary server, etc.) providing an advertisement over a service virtual network is disclosed. The device may include a service virtual network communication interface that may be coupled to the service virtual network and may be controlled by a service virtual network server function. The device may further include one or more processors coupled to the service virtual network communication interface and one or more storage devices coupled to the one or more processors. The one or more processors may execute the service virtual network server function. In addition, it may include one or more software applications stored in the one or more storage devices and executed by the one or more processors, the one more software applications may: (i) receive user data, analytical information, and cross-service functional data for one or more services from the service virtual network communication interface; (ii) process the user data analytical information and cross-service functional data for the one or more services and generates an advertisement based on the user data, analytical information, and cross-service functional data; and (iii) transmits the advertisement to the service virtual network communication interface.

Within the embodiments described below, an exemplary method for providing one or more advertisements over a plurality of service virtual networks is disclosed. The method includes collecting a set of user data, analytical information and cross-service functional data from one or more end point device communication interfaces, the set of user data corresponds to user data for one or more services using one or more device software applications, the one or more device software applications stored in at least one of the one or more storage devices and executed by one or more device processors of a device. Another step in the method may be providing user data, analytical information, and cross-service functional data to the one or more services to one or more service communication interfaces using the one or more device software applications. A further step receiving one or more advertisements from the one or more service communication interfaces using one or more device software applications. An additional step in the method may be transmitting the one or more advertisements to the one or more end point communication interfaces using one or more device software applications. Other steps in the method may include managing the one or more advertisements based on the user data, analytical information, and cross-service functional data and generating one or more advertisements based on the user data, analytical information, and cross-service functional data. The one or more end point device communication interfaces and the one or more service communication interfaces may be service virtual network communication interfaces and couple to one or more service virtual networks.

Within the embodiments described below, an exemplary method for providing an advertisement over a service virtual network is disclosed. The method may include receiving user data, analytical information, and cross-service functional data for one or more services from the service virtual network communication interface services using one or more device software applications, the one or more device software applications stored in one or more device storage devices of a device and executed by one or more device processors of the device. Another step in the method may be processing the user data, analytical information, and cross-service functional data for the one or more services and generating an advertisement based on the processed user data, the analytical information and cross-service functional data using one or more device software applications. A further step in the method may be transmitting the advertisement to the service virtual network interface services using one or more device software applications. The service virtual network communication interface and couple to the service virtual networks.

Within the embodiments described below, an exemplary system for providing a plurality of services to premises over one or more communication networks is disclosed. The system may include one or more secure access nodes. Each may have one or more secure access node processors, one or more secure access node storage devices, and one or more secure access node software applications. The system may further include a primary server coupled to the one or more secure access nodes over one or more wide area communication networks. The primary server may have one or more primary server processors, one or more primary server storage devices, and one or more primary server software applications. In addition, the one or more secure access node software applications and the one or more primary server software applications may: (i) collect a set of service data, including analytical information and cross-service data, for each of the one of the services across one or more service virtual network communication interfaces; and (ii) generate and provide cross-service user data and cross-service functions to the at least one service based upon the set of service data and analytical information across one or more service virtual network communication interfaces. The one or more service virtual network communication interfaces may include end point device communication interfaces and service communication interfaces, all of which may couple with one or more service virtual networks.

Within the embodiments described below, an exemplary method for providing a plurality of services to premises over one or more communication networks is disclosed. The method may include collecting a set of service data, including analytical information and cross-service functional data, for one or more services using one or more secure access node software applications and one or more primary server software applications, the one or more secure access node software applications stored in the one or more secure access node storage devices and executed by one or more secure access node processors, and the one or more primary server software applications stored in one or more primary server storage devices of a primary server and executed by one or more primary server processors. The method may further include providing cross-service functions to the one or more services based upon the second set of service data and analytical information across one or more service virtual network communication interfaces. The one or more service virtual network communication interfaces may include end point device communication interfaces and service communication interfaces, all of which may couple with one or more service virtual networks.

Within the embodiments described below, an exemplary method for providing a plurality of services to premises over one or more communication networks is disclosed. The method may include generating one or more service virtual networks using a primary server and one or more secure access nodes, wherein each of the one or more service virtual networks provides one or more services. Another step in the method may be providing one or more incentive schemes for the one or more services and use one or more service virtual networks based on one or more network attributes to generate one or more additional services to end users. In addition, the network attributes include cross-service user data, cross-service functional data and network information. A further step may be receiving revenue from one or more service providers based on the one or more incentive schemes and one or more network attributes. Additional steps in the methods may include collecting a set of service data, including analytical information and a first set of cross-service data—for one or more services using one or more secure access node software applications, and one or more primary server software applications, providing a portion of the first set of service data, a portion of the first set of cross-service data and a portion of the analytical information, for the one or more services to a service virtual network communication interface, and generating and providing a second set of cross-service data based upon the set of service data and the analytical information and providing the first set of cross-service data and the second set of cross-service data to the one or more services. The service virtual network communication interfaces may include end point device communication interfaces and service communication interfaces, all of which may couple with one or more service virtual networks.

The exemplary method may further include steps receiving a portion of the revenue based on the collected service data and analytical information, the provided portion of service data and a portion of analytical information, receiving a commission for providing a portion the first set of cross-service data, the provided portion of analytical information, and the provided portion of the second set of cross-service data, for the one or more services, receiving a transaction fee based on the one or more services performing transactions using the provided portion of first set of cross-service data provided portion of analytical information, and provided portion second set of cross-service data, and receiving a cross-service fee for providing the portion of the first set of cross-service data and the portion of the second set of cross-service data to the one or more services. Additional steps in the methods may include receiving one or more e-commerce incentives for providing secure e-commerce access and secure e-commerce functions and providing targeted advertising services and targeted e-commerce services cross-service functions, and other functions provided by a primary service provider and secondary service provider.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

Figure 1A:
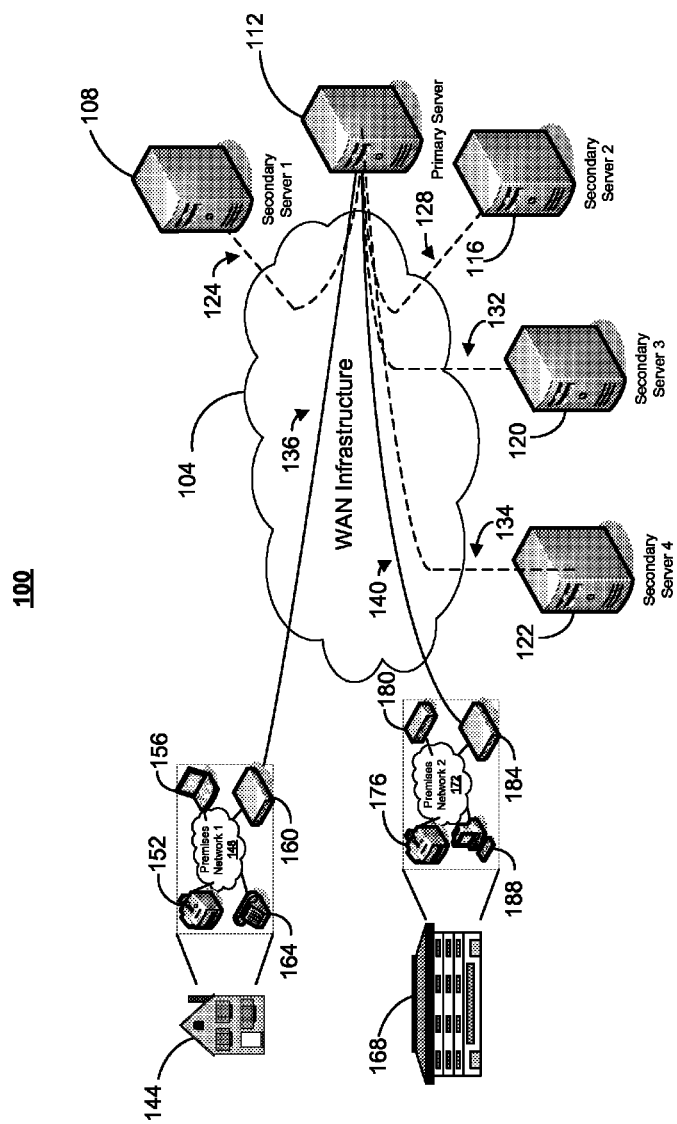
FIG. 1A is an exemplary network architecture providing multiple services to premises over communication networks.

In the following detailed description, reference is made to the accompanying drawings, which for a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of difference configurations, all of which are explicitly contemplated herein. Further, in the following description, numerous details are set forth to further describe and explain one or more embodiments. These details include system configurations, block module diagrams, flowcharts (including transaction diagrams), and accompanying written description. While these details are helpful to explain one or more embodiments of the disclosure, those skilled in the art will understand that these specific details are not required in order to practice the embodiments.

Traditionally, terminal network devices and/or service provider servers generate, control, and maintain service virtual networks that may be inefficient and expensive. The present application discloses systems, devices, and methods for providing virtual networks for multiple services. Aspects of the disclosed systems, devices, and methods have intermediate network nodes generate, control, and maintain virtual service networks for individual and business consumers. The intermediate nodes may be customer premises equipment or a server of a primary service provider (e.g. Internet Service Provider). Further, while maintaining the virtual service networks, the intermediate network nodes may inspect data packets of different services and collect service application data. Consequently, the intermediate nodes may process the collected data to maintain segregation between services, increase security from third party intrusion into the virtual service networks, generate additional robust service features by analyzing data across different services, and provide consumer behavioral data to enhance user experiences and security on e-commerce activities. In addition, having virtual network management and control for multiple services implemented by intermediate nodes in a network such as several primary server (e.g. primary service provider server) or several customer premises equipment has the further advantages of having the virtual network management and control mechanism residing in only a few intermediate nodes rather than a comparatively larger number of terminal network devices (e.g. end point devices) and service providers servers (e.g. secondary servers).

FIG. 1A is an exemplary network architecture 100 providing multiple services to premises over communication networks. The network architecture 100 may include a wide area network (WAN) infrastructure 104 that provides network connectivity using communications links (124, 128, 132 and 134) between a primary service provider server (e.g. primary server) 112 and one or more secondary service provider servers (e.g. secondary servers) (108, 116, 120, and 122). A wide area network may be network of nodes or computers whose communication links spans a broad area including crossing metropolitan, regional, national, and continental political and geographic boundaries. Examples of wide area networks may include the Internet, wireless wide area communication networks, metropolitan area network, cellular networks, and WiMAX networks. The Wide Area Network Infrastructure 104 may include network elements or nodes that facilitate network connectivity between terminal network devices and servers (e.g. primary server, secondary servers, etc.) as shown by the network architecture 100 in FIG. 1A. Examples of such network elements or nodes include routers, switches, multiplexers, servers, etc. Communication links between network elements and nodes that are part of the WAN infrastructure such as the communication links (124, 128, 132, and 134) between the secondary servers (108, 116, 120, and 122) and the primary server 112 may incorporate packet switching technology, circuit switching technology, or a combination of both.

In addition to providing network connectivity between the primary server 112 and the secondary servers (108, 116, 120, and 122), the WAN infrastructure 104 provides network connectivity between the primary server and one or more secure access nodes (160 and 184). Although FIG. 1A shows the primary server 112 connected to two secure access nodes (160 and 184), persons of ordinary skill in the art would recognize that the primary server may be connected to additional secure access nodes. As with the other communication links (124, 128, 132, and 134) pictured in FIG. 1A, the communication links (136 and 140) between the secure access nodes (160 and 184) and the primary server 112 may incorporate packet switching technology, circuit switching technology, or a combination of both. Further, the exemplary network 100 shows that secondary servers may communicate to end point devices (152, 156, 164, 176, 180, and 188) (e.g. terminal devices) through the WAN infrastructure 104, the primary server 112, one or more secure access nodes (160 and 184) and one or more premises networks (148 and 172).

Each of the secure access nodes (160 and 184) reside on customer premises. One secure access node 160 resides in a home customer premises 144 and another secure access node 184 resides in a business customer premises 168. The home customer premises 144 may include a premises communication network 148 connecting the secure access node 160 to multiple terminal network or end point devices (152, 156, and 164). Alternatively, the business customer premises 168 may include a premises communication network 172 connecting the secure access node 184 to multiple terminal network or end point devices (176, 180, and 188). Further, each of the secure access nodes may have multiple communication interfaces supporting different protocols (e.g. USB, Ethernet, Firewire, Bluetooth, WiFi, etc.). One communication interface on each of the secure access nodes (160 and 184) may be connected to the WAN Infrastructure 104. Another communication interface may be connected to their respective premises networks (148 and 172).

A primary service provider that may own or operate the primary server 112 may be an Internet Service Provider (ISP), for example, or any multi-service operator (MSO) such as a cable television company, telephone company, or any other company that may also be an ISP. The primary server may provide services to one or more end point devices located on customer premises (144 and 168) over the WAN infrastructure 104. For example, the primary server 112 may provide Internet access, email, network security as well as other types of features or services. An end point device, such as a personal computer 156 may utilize such services. In addition, secondary service providers may own and operate the secondary servers (108, 116, 120, and 122) to provide their respective services. Secondary service providers may provide services such as Voice-over-Internet-Protocol (VoIP), energy management, premises security, electronic security, different types of e-commerce, media streaming and storage, etc. In FIG. 1A, for example, a secondary server 108 may provide energy management services, another secondary server 116 may provide premises security services, a third secondary server 120, may provide e-commerce services, and a fourth secondary server 122 may provide VoIP services to one or more end point devices (152, 156, 164, 176, 180, and 188).

For example, in the exemplary network 100, end point device 152 and end point device 176 may represent customer premises equipment for a premises (home or office) security service provider. The end point devices (152 and 176) may include sensors and alarms that are located throughout the premises (home 144 or office 168) that provide information to the premises server 116. Another example in the network 100 may be that end point device 156 is a home computer and end point device 188 is an enterprise computer. A primary server 112 may be a server owned and operated by an Internet Service Provider (ISP) or MSO and provide the end point device 156 and end point device 188 with a variety of services such as providing Internet access, email, and network security. Further, a secondary server 120 may be provide e-commerce services such as providing an electronic market place for the users of end point devices (156 and 188) to buy and sell goods. An additional example in network 100 may be that end point device 180 may be a premises energy management system and secondary server 108 may be energy management server. End point device 180 may include different sensors that provide the energy management server 120 with energy consumption and other energy management information for different portions of the office 168. A further example may be that end point device 164 is a VoIP telephone and the secondary server 122 is a VoIP server providing voice telephony services (e.g. telephony, caller identification, voicemail, etc.) to the home 144.

Figure 1B:
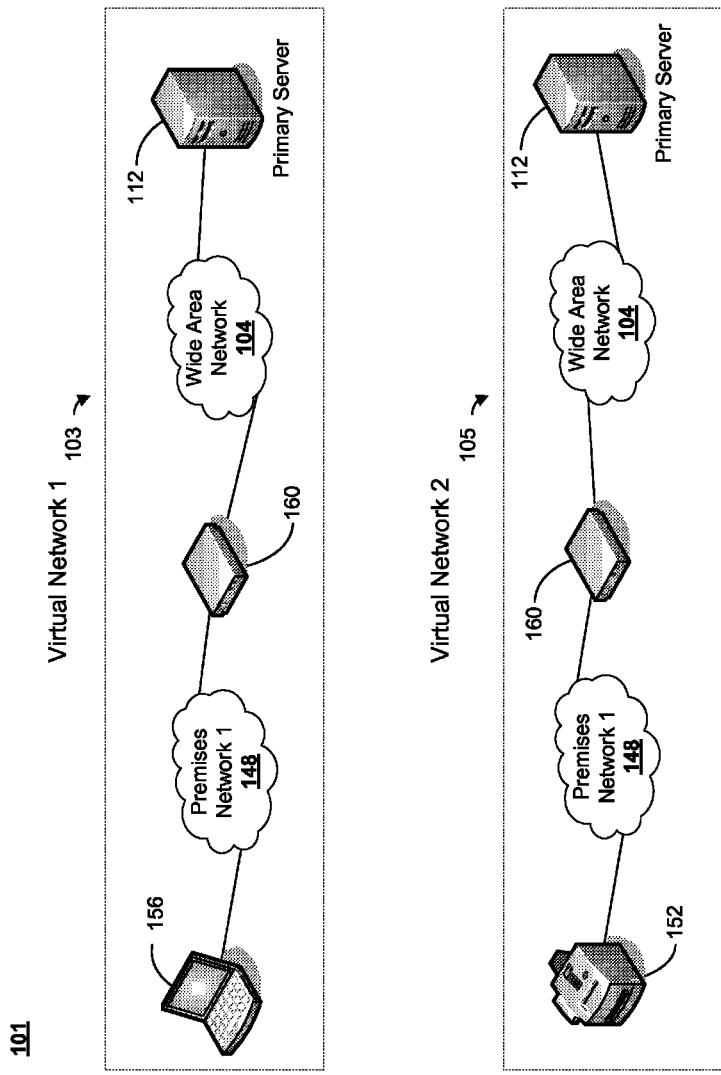
FIG. 1B-1E show exemplary network architectures for individual virtual networks.
Figure 1C:
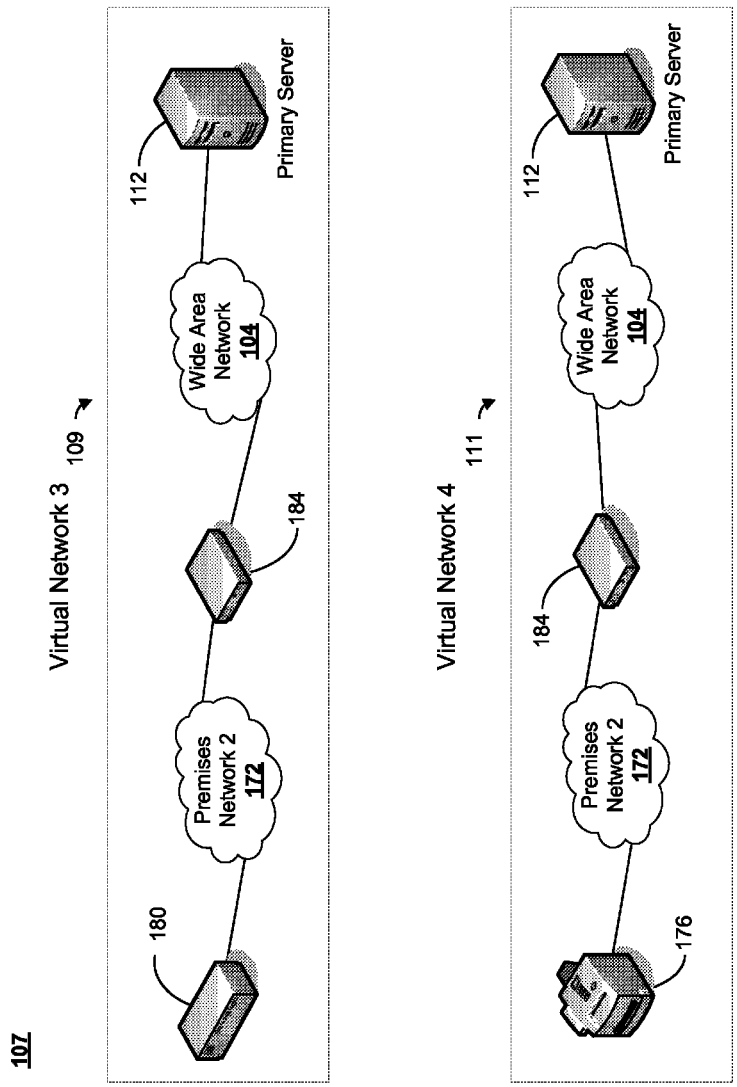

FIG. 1B shows exemplary network architectures 101 for two different individual virtual networks (103 and 105). The network elements and communication networks shown in FIG. 1A are used in illustrating virtual networks (103 and 105) shown in FIG. 1B. A virtual network 103 includes primary server 112, wide area network 104, secure access node 160, premises network 148, and end point device 156. As mentioned in describing FIG. 1A, the primary server 112 may be owned and operated by an Internet Service Provider (ISP) or MSO and provide the end point device 156 with a variety of services such as provide Internet access, email, and network security. The virtual network segregates the services provided by the ISP (e.g. Internet access, email, and network security, etc) from other services received by the end point device 156 such as, for example, e-commerce services from secondary server 120. A software platform residing on the primary server 112 or a software and hardware platform residing on the secure access node 160 may generate and maintain the virtual network 103 and segregates the ISP services from other services provided to the end point device 156.

Further, a virtual network 105 includes primary server 112, wide area network 104, secure access node 160, premises network 148, and end point device 152. The primary server 112 may be owned and operated by an Internet Service Provider (ISP) or MSO. The end point device 152 may be customer premises equipment for a premises (home or office) security service provider that may include sensors and alarms located throughout the premises (home 144) that provide information to the premises server 108. In traditional networks, the primary server 112 may not be involved in any of the services provided by the premises security service provider. However, in the virtual network 105, the primary server 112 and/or the secure access node 160 may segregate the premises security service from other services (email, network security, e-commerce, energy management, VoIP, etc.) as a virtual network. A software platform residing on the primary server 112 or a software and hardware platform residing on the secure access node 160 may generate and maintain the virtual network 105 and segregates the premises security services from other services provided to the end point device 152.

Figure 10:
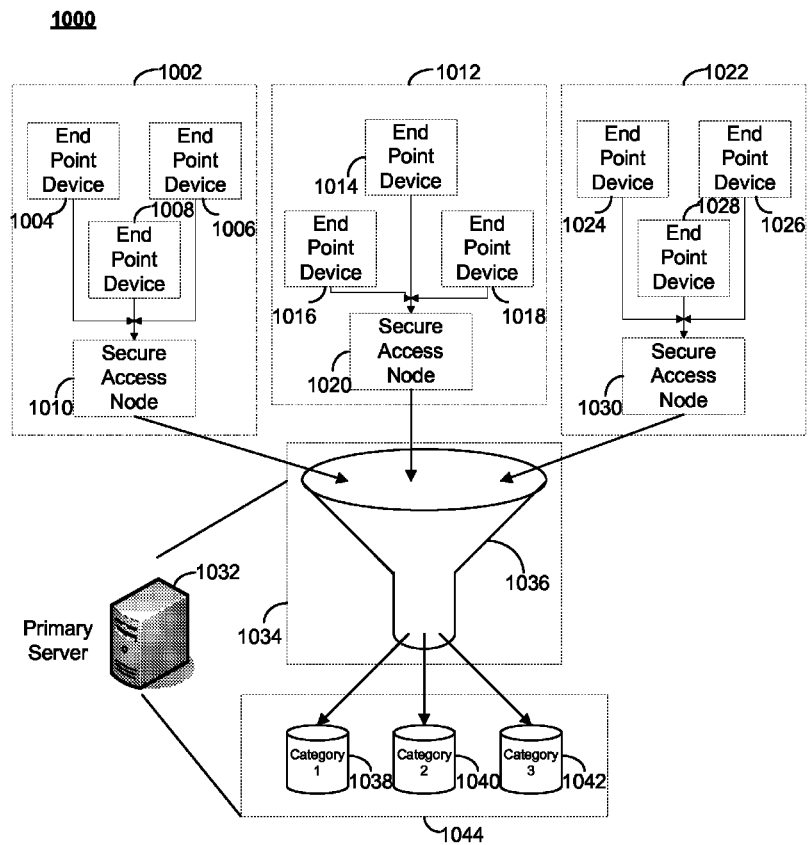
FIG. 10 illustrates exemplary aspects of the primary service provider server that provide additional service features in providing multiple services to premises over communication networks.

FIG. 10 shows exemplary network architectures 107 for two different individual virtual networks (109 and 111). The network elements and communication networks shown in FIG. 1A are used in illustrating virtual networks (109 and 111) shown in FIG. 10. A virtual network 109 includes primary server 112, wide area network 104, secure access node 184, premises network 172, and end point device 180. The primary server 112 may be owned and operated by an Internet Service Provider (ISP) or MSO and provide the end point device 180 with a variety of services such as provide Internet access, email, and network security. The virtual network segregates the services provided by the ISP (e.g. Internet access, email, and network security, etc) from other services received by the end point device 180 such as, for example, e-commerce, premises security, and energy management services from a secondary server. A software platform residing on the primary server 112 or a software and hardware platform residing on the secure access node 184 may generate and maintain the virtual network 109 and segregates the ISP services from other services (e.g. energy management services) provided to the end point device 180.

Further, a virtual network 111 includes primary server 112, wide area network 104, secure access node 184, premises network 172, and end point device 176. The primary server 112 may be owned and operated by an Internet Service Provider (ISP) or MSO. The end point device 176 may be customer premises equipment for a premises (home or office) security service provider that may include sensors and alarms located throughout the premises (office 168) that provide information to the premises server 108. In traditional networks, the primary server 112 may not be involved in any of the services provided by the premises security service provider. However, in the virtual network 111, the primary server 112 and/or the secure access node 184 may segregate the premises security service from other services (email, network security, e-commerce, energy management, VoIP, etc.) as a virtual network. A software platform residing on the primary server 112 or a software and hardware platform residing on the secure access node 184 may generate and maintain the virtual network 111 and segregates the premises security services from other services provided to the end point device 176.

Figure 1D:
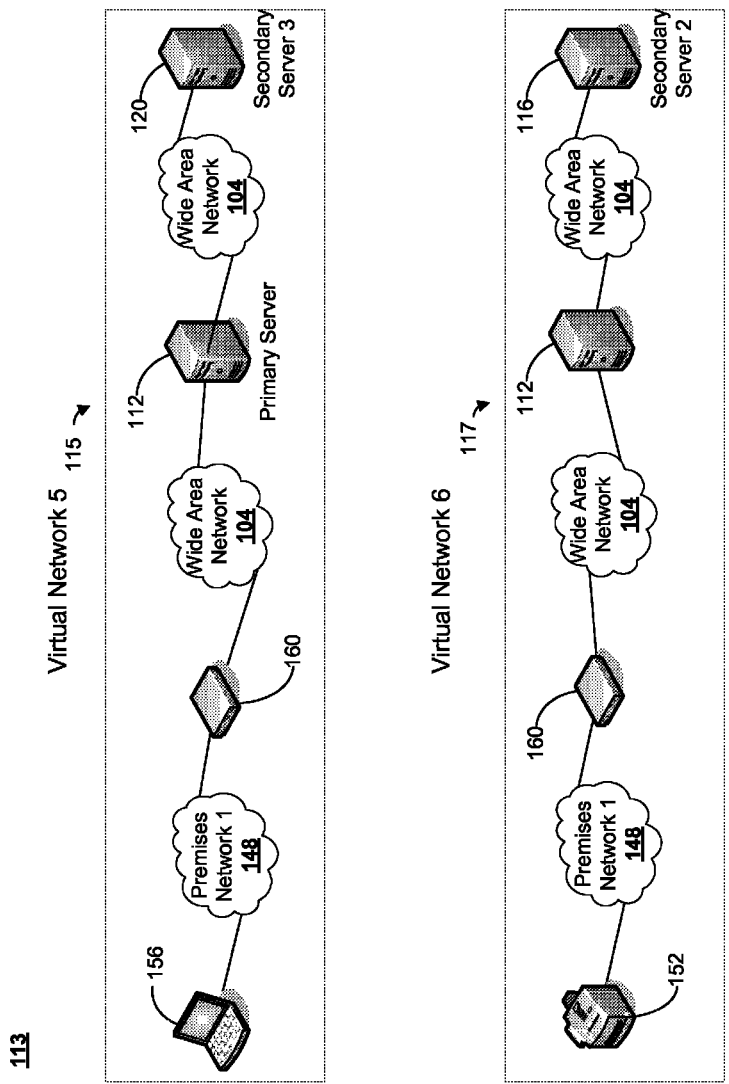

FIG. 1D shows exemplary network architectures 113 for two different individual virtual networks (115 and 117). The network elements and communication networks shown in FIG. 1A are used in illustrating virtual networks (115 and 117) shown in FIG. 1D. A virtual network 115 includes primary server 112, wide area network 104, secure access node 160, premises network 148, and end point device 156 as well as secondary server 3 (120). The secondary server 3 (120) may be owned or operated by an e-commerce service provider and may allow an end point device user to buy and sell goods in an electronic marketplace, for example. The primary server 112 may be owned and operated by an Internet Service Provider (ISP) or MSO and provide the end point device 156 with a variety of services such as provide Internet access, email, and network security. However, the virtual network segregates the services provided by the ISP (e.g. Internet access, email, and network security, etc) from other services received by the end point device 156 such as e-commerce services from secondary server 108. A software platform residing on the primary server 112 or a software and hardware platform residing on the secure access node 160 may generate the virtual network 115 and segregates the ISP services from the e-commerce services provided to the end point device 156. In addition, the software platform on the primary server 112 or a software and hardware platform residing on the secure access node 160 may provide additional features to a particular service or across a range of services that are segregated in virtual networks as will be described in the present disclosure.

Further, a virtual network 117 includes primary server 112, wide area network 104, secure access node 160, premises network 148, and end point device 152 as well as secondary server 2 (116). The primary server 112 may be owned and operated by an Internet Service Provider (ISP). The end point device 152 may be customer premises equipment for a premises (home or office) security service provider that may include sensors and alarms located throughout the premises (home 144) that provide information to secondary server 2, the premises security server 116. In a traditional network, the primary server 112 may not be involved in any of the services provided by the premises security service provider. However, in the virtual network 117, the primary server 112 and/or the secure access node 160 may segregate the premises security service from other services (email, network security, e-commerce, energy management, VoIP, etc.) as a virtual network. A software platform residing on the primary server 112 or a software and hardware platform residing on the secure access node 160 may generate and maintain the virtual network 117 and segregates the premises security services from other services provided to the end point device 152. In addition, the software platform on the primary server 112 or a software and hardware platform residing on the secure access node 160 may provide additional features to a particular service or across a range of services that are segregated in virtual networks as will be described in the present disclosure.

Figure 1E:
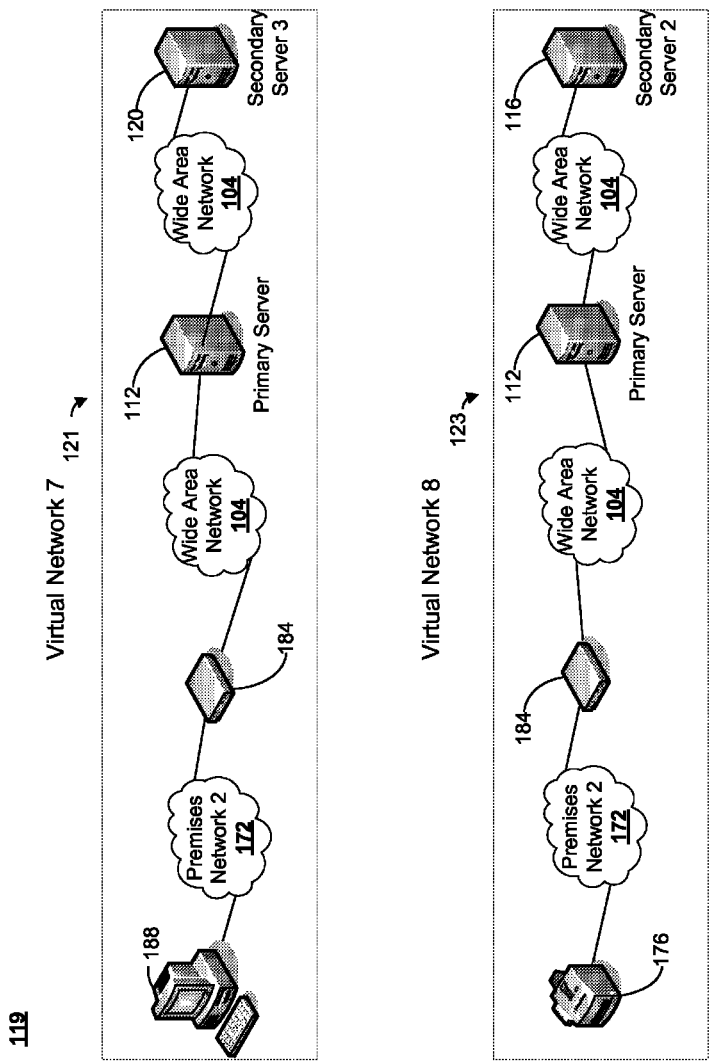

FIG. 1E shows exemplary network architectures 119 for two different individual virtual networks (121 and 123). The network elements and communication networks shown in FIG. 1A are used in illustrating virtual networks (121 and 123) shown in FIG. 1E. A virtual network 121 includes primary server 112, wide area network 104, secure access node 184, premises network 172, and end point device 188 as well as secondary server 3 (120), an e-commerce server 120. The primary server 112 may be owned and operated by an Internet Service Provider (ISP) or MSO and provide the end point device 188 with a variety of services such as provide Internet access, email, and network security. The virtual network segregates the services provided by the ISP (e.g. Internet access, email, and network security, etc) from other services received by the end point device 188 such as, for example, e-commerce services from secondary server 120. A software platform residing on the primary server 112 or a software and hardware platform residing on the secure access node 184 may generate and maintain the virtual network 121 and segregates the ISP services from e-commerce services as well as the other services provided to the end point device 188. In addition, the software platform on the primary server 112 or a software and hardware platform residing on the secure access node 184 may provide additional features to a particular service or across a range of services that are segregated in virtual networks as will be described in the present disclosure.

Further, a virtual network 123 includes primary server 112, wide area network 104, secure access node 184, premises network 172, and end point device 176 as well as secondary server 2 (116). The primary server 112 may be owned and operated by an Internet Service Provider (ISP) or MSO. The end point device 176 may be customer premises equipment for a premises (home or office) security service provider that may include sensors and alarms located throughout the premises (office 168) that provide information to the premises server 116. In traditional networks, the primary server 112 may not be involved in any of the services provided by the premises security service provider. However, in the virtual network 123, the primary server 112 and/or the secure access node 184 may segregate the premises security service from other services (email, network security, e-commerce, energy management, VoIP, etc.) as a virtual network. A software platform residing on the primary server 112 or a software and hardware platform residing on the secure access node 184 generate the virtual network 123 and segregates the premises security services from other services provided to the end point device 176. In addition, the software platform on the primary server 112 or a software and hardware platform residing on the secure access node 184 may provide additional features to a particular service or across a range of services that are segregated in virtual networks as will be described in the present disclosure.

Figure 2:
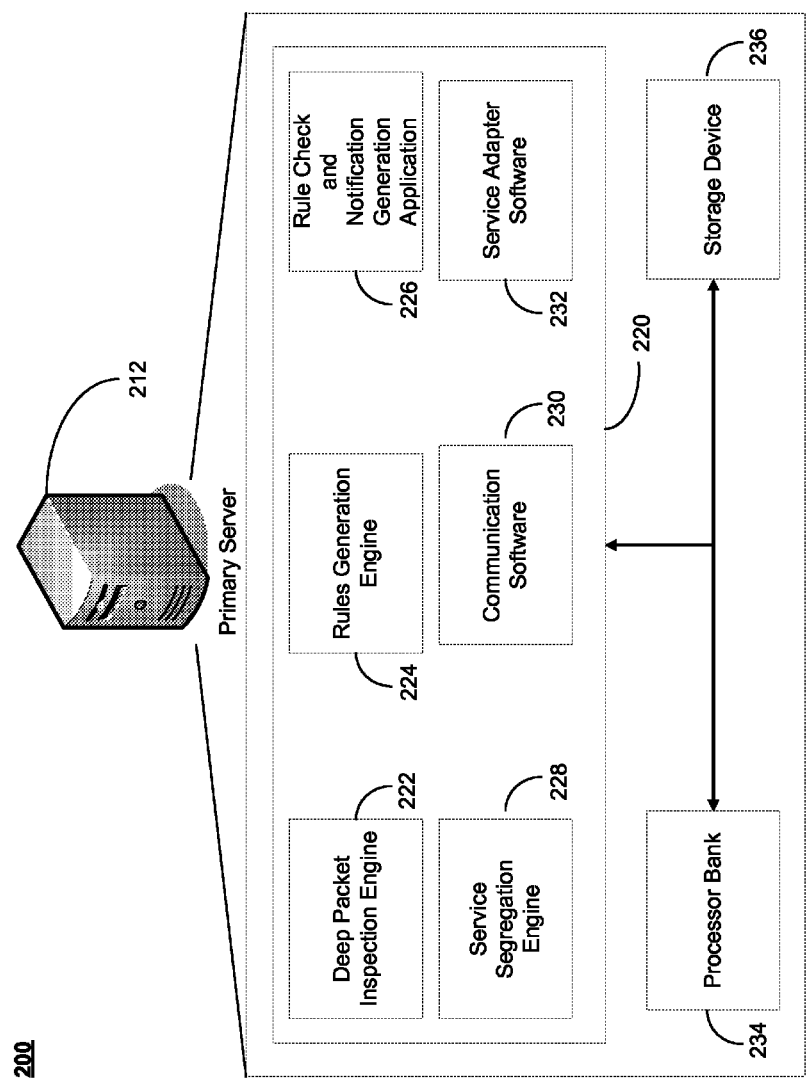
FIG. 2 shows an exemplary software platform for a primary service provider server that provides aspects of providing multiple services to premises over communication networks.

FIG. 2 shows an exemplary software platform 220 for a primary service provider server 212 that provides aspects of providing multiple services to premises over communication networks. The primary server 212 executes a server software platform 220 on one or more server processors and stores the server software platform 220 and any associated data in a server storage device 236. The one or more processors may be represented as a processor bank 234. Persons of ordinary skill in the art would understand that the one or more processors comprising the processor bank 234 may be distributed across the primary server hardware and may not be limited to being co-located next to one another. Further, the server software platform 220 includes a server deep packet inspection engine 222, a server rules generation engine 224, a server rule check and notification generation engine 226, a server service segregation engine 228, a server communication software application 230, and a server service adapter software application 232.

A primary server 212 may receive and transmit one or more data packets through one or more communication interfaces for multiple services provided to one or more end point devices. Segregating services into different virtual networks as well as providing additional features across the multiple services may require the primary server 212 to read the data within each of the one or more data packets received. Generally, the server deep packet inspection engine 222 allows the primary server to read the data within the received data packets. The data read from the one or more data packets may be stored in the server storage device 236.

To provide additional features across multiple services, the server software platform 220 may generate service rules using the server rules generation engine. Service rules are generated based on the data read from the data packets received and may be called derived rules. Custom rules may also be inputted by a user or by a service provider to the primary server 212 using a communication interface such as user interface (e.g. web browser, etc.). Service rules (e.g. derived rules, custom rules, etc.) may also be stored in the server storage device 236.

The additional features may be delivered to a service subscriber by the primary server 212 using a server rule check and notification generation engine 226. The additional features may be incorporated into one or more notifications based on a rule check or violation when analyzing the data in the received data packets. For example, a rule may be derived or inputted by a user that states no e-commerce activity may be done at a home computer end point device between 9 am to 5 pm on weekdays. However, the primary server reads received data packets indicating that a home computer is conducting an e-commerce activity at 10:03 am on a weekday. Consequently, primary server 212 may send a notification to either the home computer or the e-commerce secondary server stating a rule violation occurred.

The server software platform 220 may further include a server service segregation engine 228 that reduces the cross-service interference between different services relayed by the primary server 212 from one or more secondary service provider servers to one or more end point devices. Additionally, the server service segregation 228 engine may assist in generating and maintain a virtual network for a specific service (e.g. premises security, energy management, VoIP, e-commerce, etc.) in conjunction with other aspects of the server software platform 220 such as a server communication software application 230 and a server adapter software application 232. The server service segregation engine 228 may prevent cross-service interference, for example, when an energy management server may be attempting to shut down one or more components of a premises security system such as premises security alarms, sensors, etc.

The server communication software 230 of a server software platform may also be involved in generating and maintaining a virtual network for a specific service. The communication software may generate and maintain a communication tunnel between the primary server 212 and a secure access node to an end point device. Alternatively, the communication software may generate and maintain a communication connection such as in a virtual LAN or using MPLS technology.

In addition, the server software platform 220 may have server service adapter software 232 that may provide an adaption layer between an application layer and a network layer, or between any two layers of a communication protocol stack. Such an adaption layer provides additional functionality to the primary server 212 and a secure access node. The adaptation layer provides a mechanism for the primary server 212 and a secure access node to generate and maintain a virtual network for a specific service and reduce cross-service interference.

Figure 3:
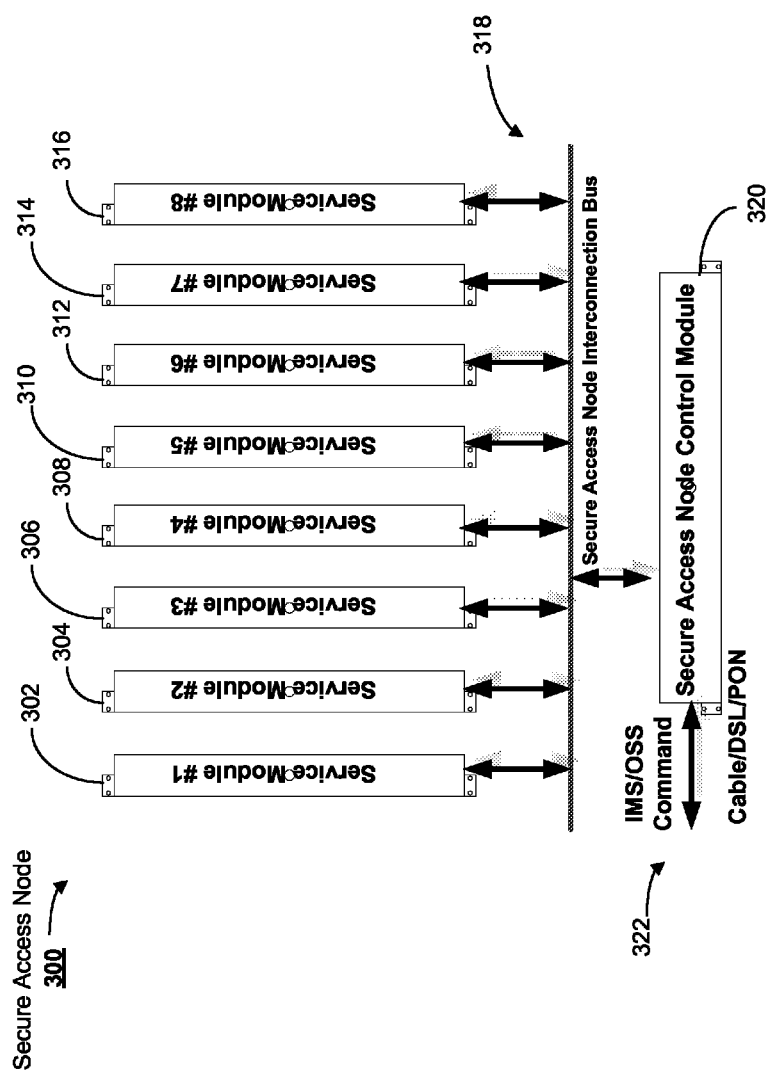
FIG. 3 shows an exemplary architecture for a secure access node that provides aspects of providing multiple services to premises over communication networks.

FIG. 3 shows an exemplary architecture for a secure access node 300 that provides aspects of providing multiple services to premises over communication networks. The exemplary secure access node 300 in FIG. 3 has eight service modules (302, 304, 306, 308, 310, 312, 314, and 316). Persons of ordinary skill in the art would recognize that a secure access node may include more or less than the exemplary number of eight service modules shown in FIG. 3. A service module within a secure access node 300 may be coupled to one or more end point devices that receive one or more services from a primary server or one or more secondary servers across a communication network (e.g. premises network, WAN, etc.). The end point devices may be coupled to a service module through one or more communication interfaces. Each communication interface may support a different communication technology (USB, Firewire, Bluetooth, Ethernet, WiFi etc.).

In addition to the eight service modules (302, 304, 306, 308, 310, 312, 314, and 316), the secure access node 300 may have a secure access control module 320. Further, the service modules (302, 304, 306, 308, 310, 312, 314, and 316) may communicate with the secure access control module 320 through a secure access node interconnection bus 318. Persons of ordinary skill in the art would understand that the secure access node interconnection bus 318 is an exemplary communication mechanism between the secure access control module 320 and the service modules (302, 304, 306, 308, 310, 312, 314, and 316) and that any other appropriate inter-node communication mechanism may be used. Further, the secure access node may have one or more communication interfaces 322 to communicate with one or more communication networks (e.g. WAN, LAN, premises network, etc.) that deal with different technology (Ethernet, DSL, PON, Cable, IMS, etc,).

Figure 4:
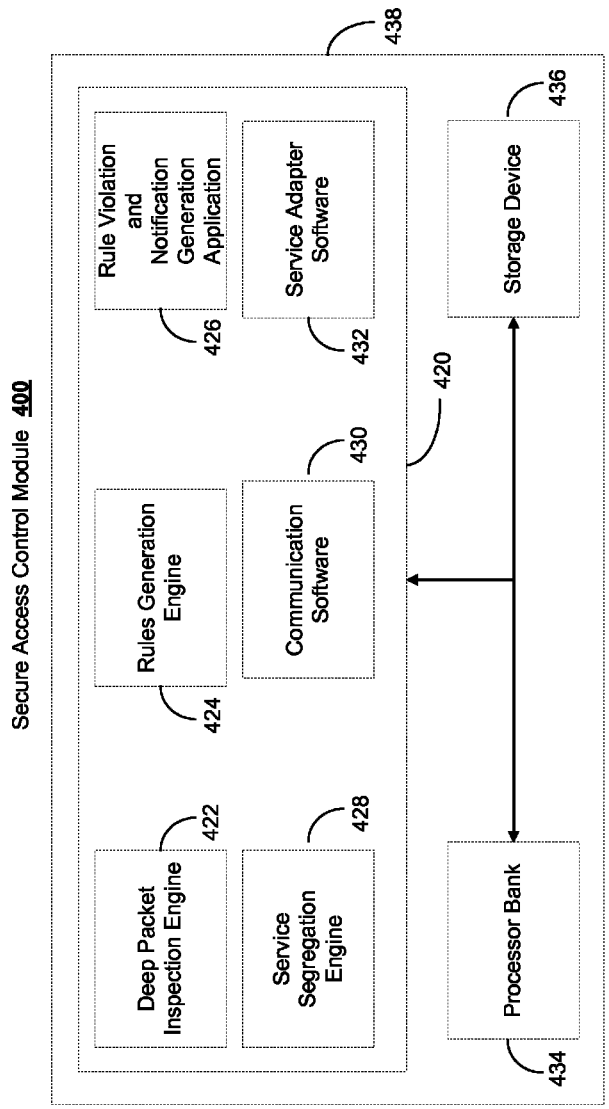
FIG. 4 shows an exemplary software platform for a secure access control module that provides aspects of providing multiple services to premises over communication networks.

FIG. 4 shows an exemplary software platform 420 for a secure access control module 400 that provides aspects of providing multiple services to premises over communication networks. The secure access control module 400 executes a server software platform 420 on one or more node processors and stores the node software platform 420 and any associated data in a node storage device 436. The one or more processors may be represented as a processor bank 434. Persons of ordinary skill in the art would understand that the one or more processors comprising the processor bank 434 may distributed across the secure access node hardware and may not be limited to being co-located next to one another. The node software platform 420 includes a node deep packet inspection engine 422, a node rules generation engine 424, a node rule check and notification generation engine 426, a node service segregation engine 428, a node communication software application 430, and a node service adapter software application 432.

The secure access control module 400 may receive and transmit one or more data packets though one or more communication interfaces for multiple services provided to one or more end point devices. Segregating services into different virtual networks as well as providing additional features across the multiple services may require the secure access control module 400 to read the data within each of the one or more received data packets. Generally, the node deep packet inspection engine 422 allows the secure access control module 400 to read the data within the received data packets. The data read from the one or more data packets may be stored in the node storage device 436.

To provide additional features across multiple services, the node software platform 420 may generate service rules using the server rules generation engine. Service rules are generated based on the data read from the received data packets and are called derived rules. Custom rules may also be inputted by a user or by a service provider to the secure access control module 400 using a communication interface such as user interface (e.g. web browser, etc.). Service rules (e.g. derived rules, custom rules, etc.) may also be stored in the node storage device 436.

The additional features may be delivered to a service subscriber by the secure access control module 400 using a node rule check and notification generation engine 426. The additional features may be incorporated into one or more notifications based on a rule check or violation when analyzing the data in the received data packets. For example, a rule may be derived or inputted by a user that states no e-commerce activity may be conducted at a home computer end point device between 9 am to 5 pm on weekdays. However, the secure access control module 400 reads received data packets indicating that a home computer is conducting an e-commerce activity at 10:03 am on a weekday. The secure access control module 400 may send a notification to either the home computer or the e-commerce secondary server, either via a primary server or directly, stating a rule violation occurred.

The node software platform 420 may further include a node service segregation engine 428 that reduces the cross-service interference between different services relayed by the secure access control module 400 to one or more end point devices. Additionally, the node service segregation 428 engine may assist in generating and maintain a virtual network for a specific service (e.g. premises security, energy management, VoIP, e-commerce, etc.) in conjunction with other aspects of the node software platform 420 such as a node communication software application 430 and a node adapter software application 432. The node service segregation engine 428 may prevent cross-service interference, for example, when an energy management server may be attempting to shut down one or more components of a premises security system such as premises security alarms, sensors, etc.

The node communication software 430 of a node software platform 420 may also be involved in generating and maintaining a virtual network for a specific service. The communication software 430 may generate and maintain a communication tunnel between the secure access control module 400 and a primary server to an end point device. Alternatively, the communication software 430 may generate and maintain a communication connection such as in a virtual LAN or using MPLS technology.

In addition, the node software platform 420 may have node service adapter software 432 that may provide an adaption layer between an application layer and a network layer or between any two layers of a communication protocol stack. Such an adaption layer provides additional functionality to the secure access control module 400 and a primary server. The adaptation layer provides a mechanism for the secure access control module 400 and a primary server to generate and maintain a virtual network for a specific service and reduce cross-service interference.

Figure 5:
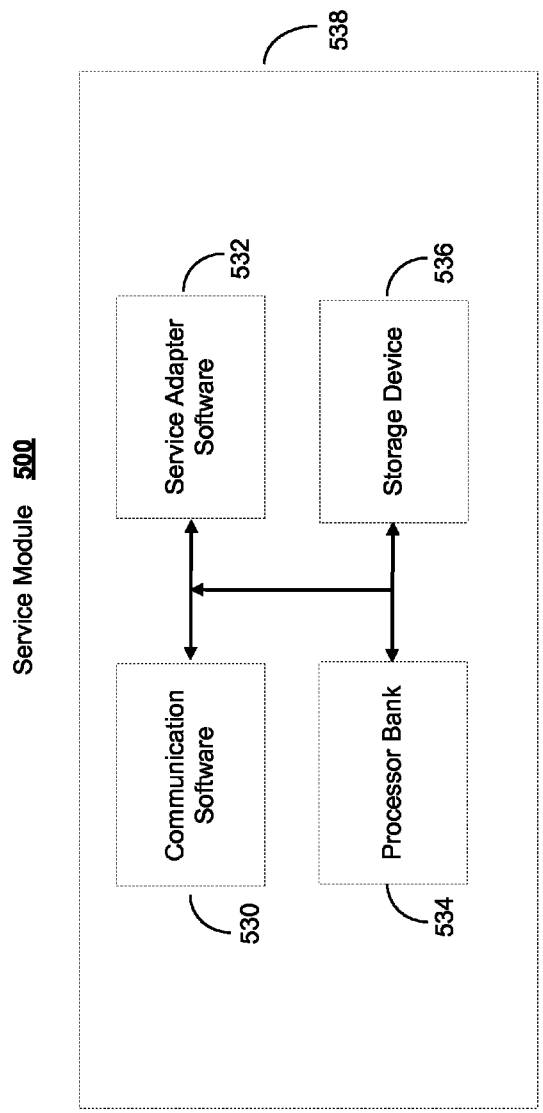
FIG. 5 shows an exemplary software platform for a service module that provides aspects of providing multiple services to premises over communication networks.

FIG. 5 shows an exemplary module software platform for a service module 500 that provides aspects of providing multiple services to premises over communication networks. The service module 500 executes a module software platform on one or more module processors and stores the module software platform and any associated data in a module storage device 536. The one or more module processors may be represented as a processor bank 534. Persons of ordinary skill in the art would understand that the one or more module processors comprising the processor bank 534 may distributed across the service module hardware and may not be limited to being co-located next to one another. The module software platform includes a module communication software application 530 and a module service adapter software application 532.

The module communication software 530 of a module software platform may be involved in generating and maintaining a virtual network for a specific service. The communication software 530 may generate and maintain a communication tunnel between an end point device, the service module 500, secure access control module and a primary server. Alternatively, the communication software 530 may generate and maintain a communication connection such as in a virtual LAN or using MPLS technology.

In addition, the module software platform may have module service adapter software 532 that may provide an adaption layer between an application layer and a network layer or any two layer of a communication protocol stack. Such an adaption layer provides additional functionality to the service module 500, a secure access control module, and a primary server. The adaptation layer provides a mechanism for the service module, secure access control module, and a primary server to generate and maintain a virtual network for a specific service and reduce cross-service interference.

Persons of ordinary skill in the art would understand that functionality incorporated in the service module 500 may be performed by a secure access control module and that service module software platform may not be needed to generate and maintain a virtual network for a specific service.

Figure 6:
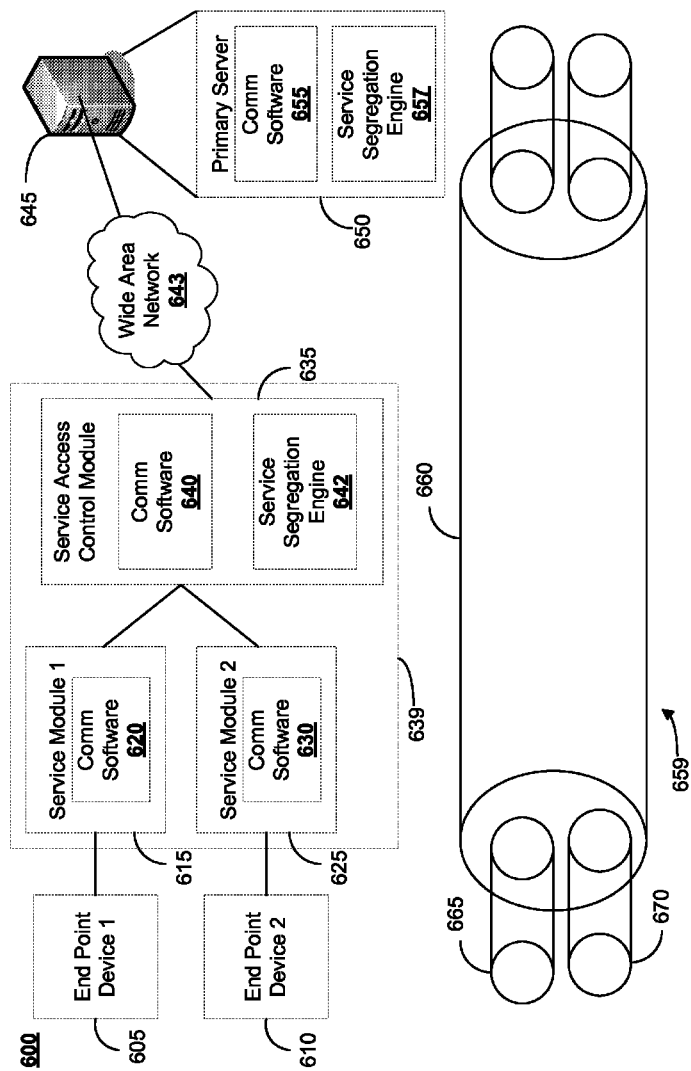
FIG. 6 illustrates exemplary communication software and service segregation aspects of providing multiple services to premises over communication networks.

FIG. 6 illustrates exemplary communication software and service segregation aspects of providing multiple services to premises over communication networks. Further, FIG. 6 shows an exemplary network 600 having a primary server 645 coupled a secure access node 639 having a secure access control module 635 and one or more service modules (615 and 625) across a wide area network 643. Each of the service modules (615 and 625) may be coupled to one or more end point devices (605 and 610) across a premises network (not shown).

The primary server 645 may have a communication software application 655 and a service segregation engine 657 both as part of a server software platform Further, the secure access control module 635 may have a node communication software application 640 and a node service segregation engine 642 both as part of a node software platform. Additionally, each of the service modules (615 and 625) may have a communication software application (620 and 630) as part of a module software platform.

The communication software applications (615, 625, 640, and 655) residing on each service module (615 and 625), the secure access control module 635, and the primary server 645 may provide tunneling or connection capabilities to generate and maintain a virtual network for each particular service provided to the end point devices (605 and 610). Examples of tunneling technology that may be used by the communication software applications (615, 625, 640, and 655) may include, but are not limited to, Generic Routing Encapsulation (GRE), Layer 2 Tunneling Protocol (L2TP), Point-to-Point Tunneling Protocol (PPTP) as well as other plaintext and non-plaintext tunneling protocols. Alternatively, the communication software applications (615, 625, 640, and 655) may utilize other communication software technologies to generate aspects of a virtual network for a particular service. These communication technologies may include Multiprotocol Label Switching (MPLS) technology or other communication technology that generates and maintains a connection using either a circuit-switched or packet-switched technology known to persons of ordinary skill in the art.

The server service segregation engine 655 and the node service segregation engine 642 may also generate and maintain aspects of a virtual network for a specific service. For example, the server service segregation engine 655 and the node service segregation engine 642 may provide additional security and decrease or reduce cross-service interference between different services supported by different virtual networks by the secure access node 639 and the primary server 645. The additional security may be provided by cryptographic protocol schemes known to persons of ordinary skill in the art that include, but are not limited to, symmetric-key algorithms such as Data Encryption Standard (DES), Triple DES, and Advanced Encryption Standard (AES) as well as public-key algorithms such as a RSA algorithm and the like. Additional security may also be provided by monitoring the state of the communication protocols such as TCP states of initiation and termination of a connection to determine that states of connection progress properly. Communication protocols may be further strengthened using proprietary protocols between the primary server 645 and service access control module 635, service module 615 and 625. Further, the server service segregation engine 657 and the node service segregation engine 642 may utilize security protocols such as IPsec and Microsoft Point-to-Point Encryption (MPPE). Persons of ordinary skill in the art would understand that IPsec may be used in conjunction with Layer 2 Tunneling Protocol and MPPE may be used in conjunction with PPTP.

In addition, the server service segregation engine 657 and the node service segregation engine 642 may also provide additional features to reduce cross-service interference. For example, the server service segregation engine 657 and the node service segregation engine 642 may prevent an energy management service provider from shutting off an alarm or sensor as part of a premises security system. Another example may be the server service segregation engine 657 and the node service segregation engine 642 preventing a home computer user from conducting e-commerce transactions between 9 am and 5 pm on weekdays.

The functionality of the server service segregation engine 657 and the node service segregation engine 642 as well as the communication software applications (615, 625, 640, and 655) may be illustrated by concentric tunnel diagram 659 shown in FIG. 6. Further, FIG. 6 shows a communication pipe 660 illustrating a connection or communication link between the primary server 645 and the secure access control module 635. Moreover, the concentric tunnel diagram 659 illustrates the tunneling/connection functionality as well as aspects of the virtual network capability provided by the server service segregation engine 655 and the node service segregation engine 642 as well as the communication software applications (615, 625, 640, and 655). Particularly, communication pipe 665 within communication pipe 660 may illustrate a tunnel or connection supporting a particular service, the tunnel or connection provided by the server service segregation engine 657 and the node service segregation engine 642 as well as the communication software applications (615, 625, 640, and 655) while communication pipe 670 may be another tunnel or connection supporting a particular service, the tunnel or connection provided by the server service segregation engine 657 and the node service segregation engine 642 as well as the communication software applications (615, 625, 640, and 655).

Figure 7:
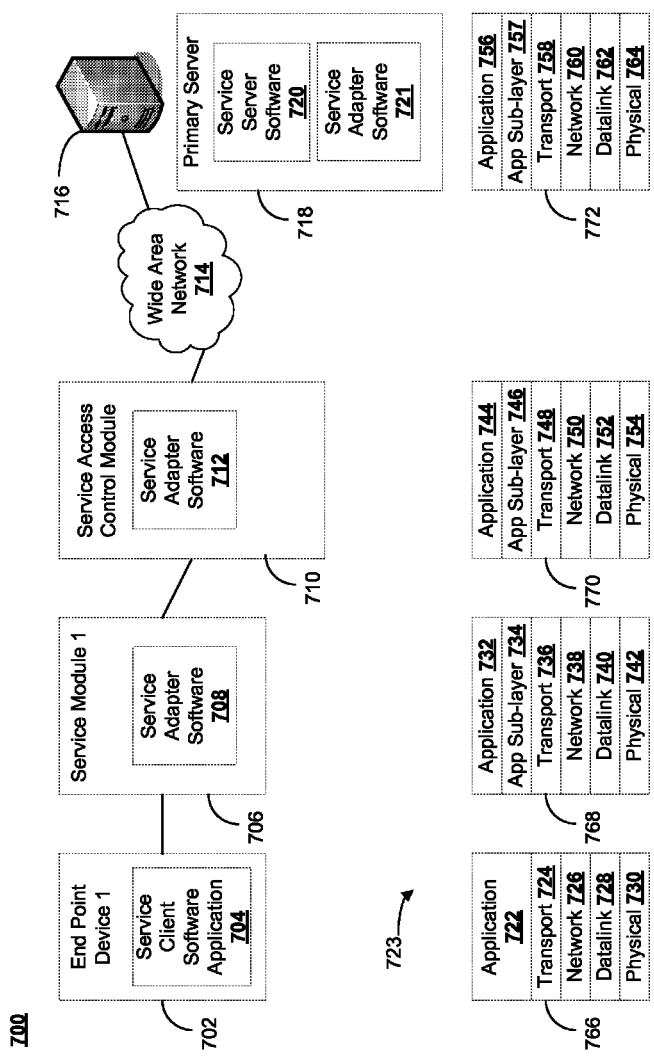
FIG. 7 illustrates exemplary service adaptation aspects of providing multiple services to premises over communication networks.

FIG. 7 illustrates exemplary service adaptation aspects of providing multiple services to premises over communication networks. Specifically, FIG. 7 shows an exemplary network 700 that includes a primary server 716 coupled to a secure access control module 710 across a wide area network (WAN) 714. Further, the secure access control module 710 may be coupled to a service module 706. In addition, the service module 706 may be coupled to an end point device 702 across a premises network. The primary server 716 may have a server service adapter software application 721 as part of the primary servers server software platform. Also, the primary server 716 may have server service application software 720 that provides service functionality to the end point device 702. For example, the end point device 702 may be a home computer and the primary server 716 may provide email services to such an end point device 702. Thus, the end point device may have a client service software application 704 that supports the features provided by the service server software application 720. For example, the client service software application 704 may be a client email software application that supports the email services provided by the service server software application 720.

In addition, FIG. 7 shows an exemplary functional block diagram 723 that illustrates the functionality of the server service adapter software application 721, the node service adapter software application 712, and the module service adapter software application 708. Particularly, the exemplary functional block diagram 723 shows a server protocol stack 772 implemented by the primary server 716, a node protocol stack 770 implemented by the secure access control module 710, a module protocol stack 768 implemented by the service module 706, and an end point device protocol stack 766 implemented by the end point device 702.

An application layer 756 may be at the top of the server protocol stack 772 implemented by the service server software application 718. Below the application layer 756 may be an application sub-layer 757 implemented by the server service adapter software application 721. Under the application sub-layer 757, maybe a transport layer 758, network layer 760, datalink layer 762, and physical layer 764.

Further, an application layer 744 may be at the top of the node protocol stack 712 residing on the secure access control module 712. Below the application layer 746 may be an application sub-layer 746 implemented by the node service adapter software application 712 residing on the secure access control module 710. Under the application sub-layer 746, may be a transport layer 748, network layer 750, datalink layer 752, and physical layer 754.

In addition, an application layer 732 may be at the top of the module protocol stack 768 residing on the service module 706. Below the application layer 732 may be an application sub-layer 734 implemented by the module service adapter software application 708 residing on the service module 706. Under the application sub-layer 734, may be a transport layer 736, network layer 738, datalink layer 740, and physical layer 742.

Also, an application layer 722 may be at the top of the end point device protocol stack 766 implemented by the client service software application residing on the end point device 702. Below the application layer 732 may be a transport layer 724, network layer 726, datalink layer 728, and physical layer 730.

The server service adapter software application 721, node service adapter software application 712, and the module service adapter software application 708 may provide a proprietary or standard sub-layer within the server protocol stack 772, node protocol stack 770, and module protocol stack 768 to generate and maintain a virtual network for a specific service between the primary server 716 and the end point device 702. For example, the server service adapter software application 721, node service adapter software application 712, and the module service adapter software application 708 may be encryption software to provide increased security (e.g. DES, RSA, proprietary methods, etc.), proprietary commands to reduce cross-service interference (e.g. preventing energy management service to turn off aspects of premises security service), and quality of service tags to provide additional service features to the end point device (e.g. prioritizing streaming video over e-commerce transactions). Persons of ordinary skill in the art would recognize that the sub-layers (723, 746, and 734) shown under the application layer (756, 744, and 732) in their respective protocol stacks (772, 770, and 768) in FIG. 7 may be implemented under any layer (e.g. application, transport, network, datalink, physical, etc.). Further, persons of ordinary skill in the art would understand that functionality depicted in the service module 706 may also be alternatively implemented by the secure access control module 710.

Figure 8:
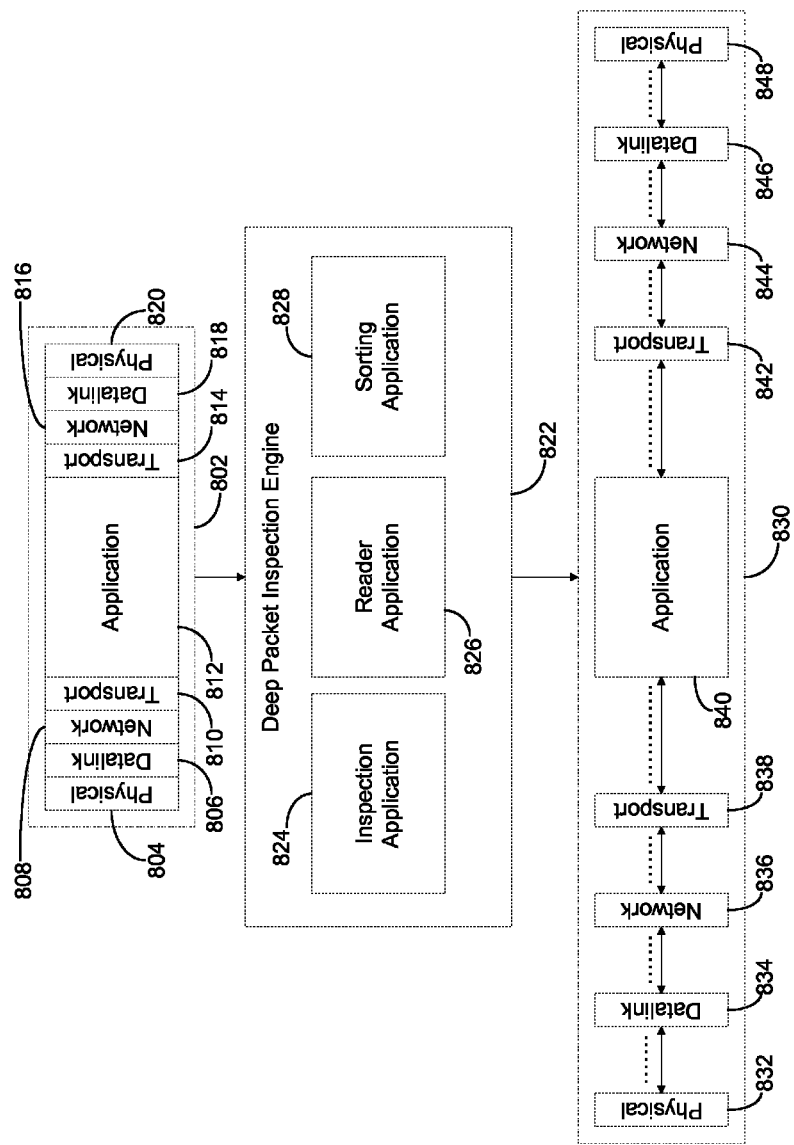
FIG. 8 illustrates an exemplary deep packet inspection engine that may be used to provide additional service features in providing multiple services to premises over communication networks.

FIG. 8 illustrates an exemplary deep packet inspection engine 822 that may be used to provide additional service features in providing multiple services to premises over communication networks. Persons of ordinary skill in the art would recognize that the deep packet inspection engine can modify and process data packets and may include functions such as count, copy, forward drop, modification, and other actions in addition to the functions described below. Further, the functions may include proprietary functions to implement novel aspects of the systems, devices, and methods disclosed.

Particularly, FIG. 8 shows a data packet 802 having an application layer 812 payload and encapsulated by a transport header 810 and a transport trailer 814 to comprise a transport layer, a network header 808 and a network trailer 816 to comprise a network layer, a datalink header 806 and a datalink trailer 818 to comprise a datalink layer, and a physical header 804 and a physical trailer 820 to comprise a physical layer. The data packet 802 may be received by a deep packet inspection engine 822. The deep packet inspection engine may be part of a server software platform residing on a primary server as shown in FIG. 2 or a node software platform residing on a secure access control module as shown in FIG. 4.

The deep packet inspection engine 822 may include an inspection software application 824, a reader software application 826, and a sorting software application 828. The inspection application 824 may decapsulate the received data packet 802 into its different layers (headers and trailers) corresponding to a protocol stack as shown in the decapsulating functional diagram 830. The reader software application 826 may read the data at each layer of the data packet such as an application layer 840, a transport layer (838 and 842), a network layer (836 and 844), a datalink layer (834 and 846) and a physical layer (832 and 848). The sorting software application 828 may analyze the data in the one or more layers (e.g. application, transport, network, datalink, and physical) and store the data in one or more memory subcomponents within a storage device.

Figure 9:
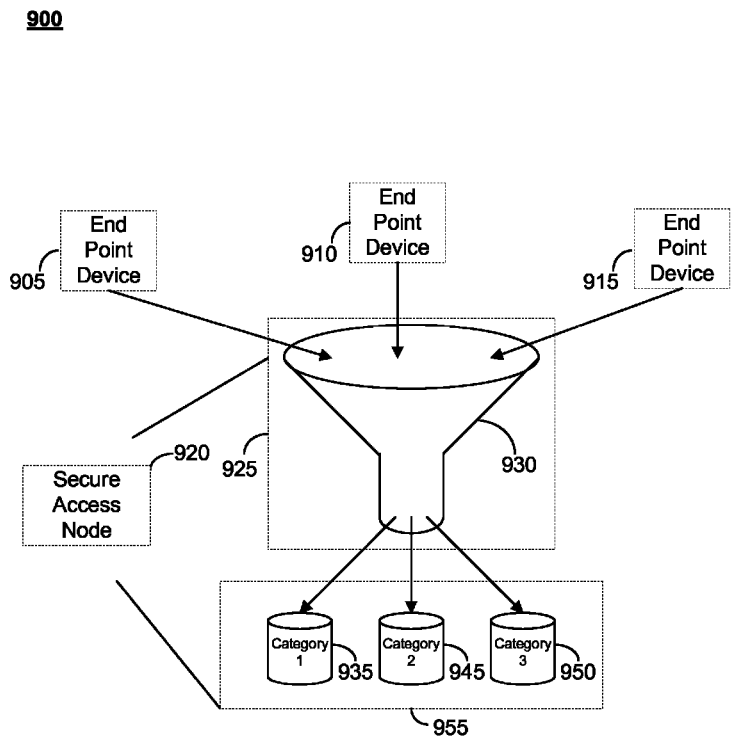
FIG. 9 illustrates exemplary aspects of the secure access node that provide additional service features in providing multiple services to premises over communication networks.

FIG. 9 illustrates exemplary aspects of the secure access node 920 that provide additional service features in providing multiple services to premises over communication networks. FIG. 9 shows a functional block diagram 900 illustrating functions of a sorting software application 930 that may be part of a deep packet inspection engine 925 which in turn may be part of a secure access node software platform. The deep packet inspection engine may receive data packets from one or more end point devices (905, 910, and 915) and inspects and reads the data packets using an inspection software application and a reader software application, respectively, as discussed in FIG. 8. The sorting software application 930 may analyze the data in the one or more layers (e.g. application, transport, network, datalink, and physical) of the received data packets and store the data in one or more memory subcomponents (935, 945, and 950) within a storage device 955 residing on the secure access node 920. Data read from the received data packets may be stored in different memory subcomponents (935, 945, and 950) according to different categories within the storage device 955 based on the analysis by the sorting software application 930. For example, data may be stored in different categories based on service type (e.g. premises security, energy management, e-commerce, etc.) or by data layer type (e.g. application, transport, network, datalink, physical, etc.).

FIG. 10 illustrates exemplary aspects of the primary service provider server 1032 that provide additional service features in providing multiple services to premises over communication networks. FIG. 10 shows a functional block diagram 1000 illustrating functions of a sorting software application 1036 that may be part of a deep packet inspection engine 1034 which in turn may be part of a primary server software platform. The deep packet inspection engine 1034 may receive data packets from one or more secure access nodes (1010, 1020, and 1030) each coupled to one or more end point devices (1004, 1006, and 1008, 1014, 1016, and 1018, and 1024, 1026, and 1028) across a premises network. Further, the deep packet inspection engine 1034 inspects and reads the data packets using an inspection software application and a reader software application, respectively, as discussed in FIG. 8. The sorting software application 1036 may analyze the data in the one or more layers (e.g. application, transport, network, datalink, and physical) of the received data packets and store the data in one or more memory subcomponents (1038, 1040, and 1042) within a storage device 1044 residing on the primary server 1032. Data read from the received data packets may be stored in different memory subcomponents (1038, 1040, and 1042) according to different categories within the storage device 1044 based on the analysis by the sorting software application 1036. For example, data may be stored in different categories based on service type (e.g. premises security, energy management, e-commerce, etc.) or by data layer type (e.g. application, transport, network, datalink, physical, etc.). Data may be stored according to other types of categories such as by secure access node (1010, 1020, and 1020) or by end point device type (e.g. computer, premises security equipment, energy management equipment, etc.).

Figure 11:
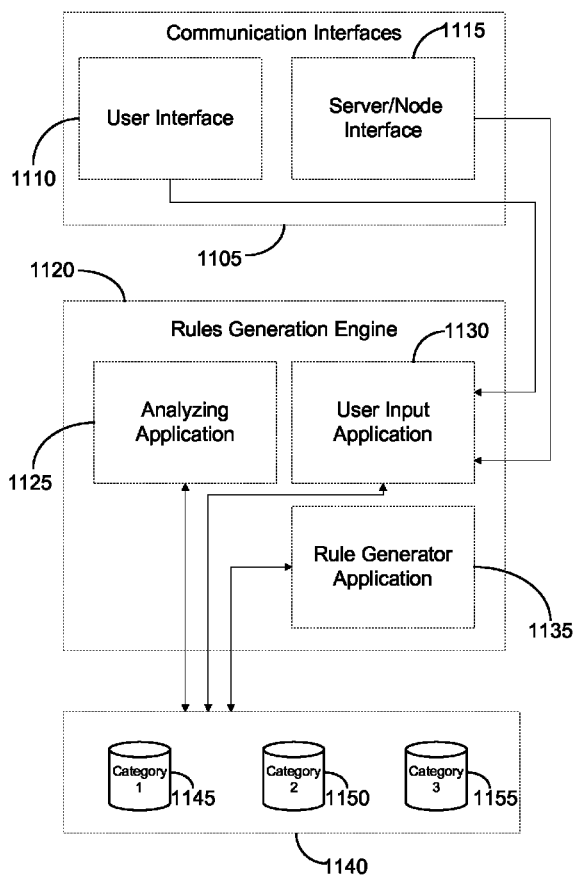
FIG. 11 illustrates an exemplary rule generation engine that may be used to provide additional service features to providing multiple services in premises over communication networks.

FIG. 11 illustrates an exemplary rule generation engine 1120 that may be used to provide additional service features to providing multiple services in premises over communication networks. The exemplary functional block diagram 1100 shown in FIG. 11 depicts different functional components of a network element such as a primary server or a secure access node. The functional components may be one or more communication interfaces 1105 that may include a user interface 1110 such as an internet browser, and a server/node communication interface such as an Ethernet, LAN, WiFi, Bluetooth, etc. interface 1115. The one or more communication interfaces 1105, including the user interface 1110 and the server/node communication interface 1115, may be coupled to the rule generation engine 1120 which is part of the server/node software platform. The rule generation 1120 may include an analyzing software application 1125, a user input software application 1130, and a rule generator software application 1135. Additionally, the rule generation engine 1120 may be coupled to a network element storage device 1140 having one or more memory subcomponents (1145, 1150, and 1155).

The storage device 1140 as well as the one or more memory subcomponents (1145, 1150, and 1155) may store data from data packets received by the network element (e.g. primary server or secure access node). Further, the data may be stored into different memory subcomponents (1145, 1150, and 1155) according to different categories such as service type (e.g. premises security, energy management, e-commerce, etc.), data layer type (e.g. application, transport, network, datalink, physical, etc.), secure access node type, or by end point device type. In addition, a user may provide user data through the user interface 1110 using a user input software application 1130 that categorizes and stores the user data into different memory subcomponents (1145, 1150, and 1155) within the storage device 1140.

The analyzing software application 1125 may access the storage device 1140 as well as the one or more memory subcomponents (1145, 1150, and 1155) to obtain the data from the received data packets and the user data. Further, the analyzing software application 1125 provides an analysis of the received data packet data and the user data and forwards the analysis to the rule generator software application 1135. Consequently, the rule generator software application 1135 determines service rules based on the data from the received data packets called derived rules and service rules based on user data called custom rules. The derived rules and the custom rules may be stored in to different memory subcomponents (1145, 1150, and 1155) within the storage device 1140 according to different categories.

For example, the analyzing software application 1125 may access the data from the received data packets and determine that an end point device such as a home computer does not conduct e-commerce between 9 am-5 pm on most days. Thus, based on such analysis the rule generator software application 1135 may generate a derived rule to prevent e-commerce activity on the end point device between 9 am-5 pm every day. However, user data may be obtained by the analyzing software application 1125 that states that e-commerce activity can be conducted on the end point device between 9 am-5 pm on weekends. Hence, the rule generator software application 1135, based on the user data may develop a custom rule to prevent e-commerce activity on the end point device between 9 am-5 pm only on weekdays.

Another example may be that the analyzing software application 1125 observes multiple facets of communications based on time of day, source address filter, traffic pattern, etc. to classify a threat level or to specify a type of threat of a received packet; Further, fuzzy logic techniques may be used, because the secure access node or primary server does not have necessary or sufficient information regarding either content or protocol of connections passing through a platform (e.g. server software platform, node software platform, etc.). In many cases, a rule check or rule violation may not be severe and the primary server's or secure access node's response may need to be proportional to the rule check or rule violation detected. As a result, fuzzy logic becomes a useful method to include into the analyzing software application 1135. A rule check fuzzy set to threat type/threat level fuzzy set relationship matrix may be established based on prior experiences using Cartesian Product Method, for example, and be stored in the memory device 1140. As a further example, a user may not place a restriction on time of day or day of week to conduct e-commerce, but that prior usage over the past month indicated that the user never conducted e-commerce during a weekday from 9 am to 5 pm. Such a fuzzy logic may be derived and used by a rule check and notification generation engine.

Figure 12:
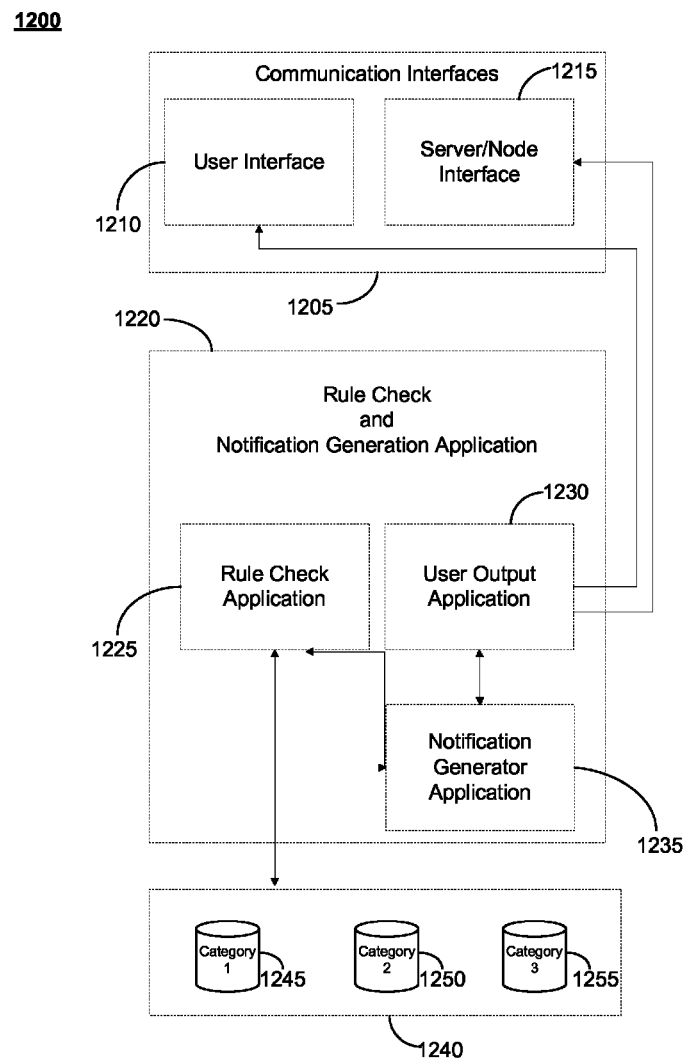
FIG. 12 illustrates an exemplary rule check and notification generation engine that may be used to provide additional service features in providing multiple services to premises over communication networks.

FIG. 12 illustrates an exemplary rule check and notification generation engine 1220 that may be used to provide additional service features in providing multiple services to premises over communication networks. The exemplary functional block diagram 1200 shown in FIG. 12 depicts different functional components of a network element such as a primary server or a secure access node. The functional components may be one or more communication interfaces 1205 that may include a user interface 1210 such as an internet browser, and a server/node communication interface such as an Ethernet, LAN, WiFi, Bluetooth, etc. interface 1215. The one or more communication interfaces 1205, including the user interface 1210 and the server/node communication interface 1215, may be coupled to the rule check and notification generation engine 1220 which may be part of the server/node software platform. The rule check and notification generation engine 1220 may include a rule check software application 1225, a user output software application 1230, and a notification generator software application 1235. Additionally, the rule check and notification generation engine 1220 may be coupled to a network element storage device 1240 having one or more memory subcomponents (1245, 1250, and 1255). The storage device 1240 as well as the one or more memory subcomponents (1245, 1250, and 1255) may store service rules including derived rules and custom rules provided by a rule generation engine as discussed when describing FIG. 11. Further, the service rules as well as data from data packets received through the one or more communication interfaces may stored into different memory subcomponents (1245, 1250, and 1255) according to different categories such as service type (e.g. premises security, energy management, e-commerce, etc.), data layer type (e.g. application, transport, network, datalink, physical, etc.), secure access node type, or by end point device type.

The rule check software application 1225 accesses the service rules as well as the data from the received data packets from the different memory subcomponents (1245, 1250, and 1255) within the storage device 1240. Further, the rule check software application 1225 determines whether a trigger event has occurred, such as rule violation, based on the service rules and the received packet data. If so, the rule check software application 1225 sends the trigger event (e.g. violation) to the notification generator software application 1235. Based on the trigger event (e.g. violation), the notification generator software application 1235 generate a trigger event notification and forwards the trigger event notification to the user output software application 1230. Additionally, the user output software application 1230 may provide the trigger event notification to the user interface 1210 to be displayed to a user.

For example, a service rule may be obtained by the rule check software application 1225 that states no e-commerce activity may be conducted between 9 am-5 pm on weekdays (prohibited time period) on a particular end point device. However, the rule check software application 1225 also obtains data from received data packets that shows the particular end point device conducting e-commerce activity at 10:03 am on a Monday. Thus, e-commerce activity is being conducted during a prohibited time according to the service rule. A trigger event along with data associated with the prohibited activity as well as the service rule may be forwarded to the notification generator software application 1235. Based on the trigger event along with prohibited activity data as well as the service rule, the notification generator software application 1235 generates an exemplary trigger event notification that may state "Warning: Prohibited E-Commerce Activity Conducted" that is forwarded to the user output software application 1230 which in turn provides the exemplary trigger event notification to the user interface 1210 to be displayed to a user. Additionally, the network element software platform may solicit a user password as part of the exemplary trigger event notification for a user to continue conducting e-commerce activity during the prohibited time period.

Another example, the rule check software application 1225 on a secure access node observes multiple facets of communications based on time of day, source address filter, traffic pattern, etc. to check a threat level or a type of threat of an incoming packet based on rules generated by a rules generation engine. Further, fuzzy logic techniques may be used because a secure access node or primary server may not have necessary or sufficient information regarding either content or protocol of connections passing through a server or node software platform. In some cases, a rule check or violation may not be severe and a primary server's or secure access node's response may need to be proportional to the rule check or violation detected. As a result, fuzzy logic becomes a useful method to incorporate into the primary server or secure access node software platform. A rule check fuzzy set to threat type/threat level fuzzy set relationship matrix may be established based on prior experiences examined by the rules generation engine. An incoming rule violating packet's violation fuzzy set may be processed based on the relationship matrix stored in the memory device 1240. By using a composite operation in the fuzzy logic, the threat level and threat type may be determined. Such a determination may be forwarded to the notification generator application 1235. Further to the example, a user may not place a restriction on time of day and day of week to conduct e-commerce, but that prior usage over the past month indicated that the user never conducted e-commerce during a weekday from 9 am to 5 pm. Such a fuzzy logic rule may be derived and used by a rule check software application. Further, a user may attempt to conduct e-commerce at 10:03 am on a Monday. A notification may be generated based on the derived fuzzy logic rule described above such as; "Warning—Potentially Unusual Activity being attempted".

Another example may be each primary server managing multiple secure access nodes each of which resides in a subscriber's premises. Information, including a number of rejected packets and usage of some popular Internet sites may be collected and compiled. Further, a rule check software application on each primary server may collect rule violation statistics of all managed secure access nodes and may compile a network wide security condition using a fuzzy set representation which may be an n-tuple of threat level of each secure access node the primary server manages on a per time period basis. This n-tuple information may be processed using each premises' preference to common Internet sites usage relationship matrix stored in the memory device 1240 to determine a potential threat level to commonly used sites on networks or subscribed secondary services such that rules (e.g. access control list) may be applied using the notification generator application 1235. Consequently, Internet resources and services are better protected although limited knowledge or limited details of a scenario are made known to the primary server. Persons of ordinary skill in the art would recognize that the fuzzy logic algorithms known in the art as well as those disclosed through the above examples or understood by those persons skilled in the art may be incorporated in other aspects or embodiments of the present disclosure.

Figure 13A:
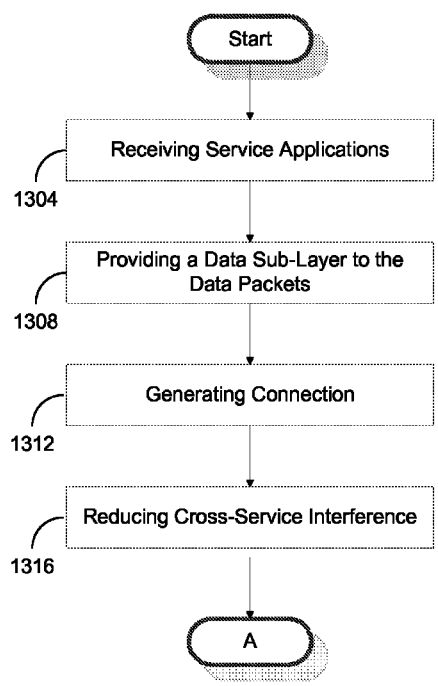
FIGS. 13A-13D are exemplary flowcharts that show example methods of providing multiple services to premises over communication networks.

FIGS. 13A-13D are exemplary flowcharts that show example methods of providing multiple services to premises over communication networks. In FIG. 13A, the example method shown may include a step for receiving one or more service applications, as shown in block 1304. The service applications may be received by a primary server or a secure access node and stored in a storage device or memory. Each of the one or more service applications may be received from the primary server or from a secondary server. For example, the one or more service applications may be an email application received from a primary server, an e-commerce application received from a secondary server, an energy management service application received from another secondary server, or other service applications.

A further step in the example method may be providing a data sub-layer to one or more data packets, as shown in block 1308, by a network element using a service adapter software application that is part of the network element's software platform. The network element may be a primary server or a secure access node. For example, the service adapter software application may be encryption software to provide increased security (e.g. DES, RSA, etc.), proprietary commands to reduce cross-service interference (e.g. preventing energy management service to turn off aspects of premises security service), and quality of service tags to provide additional service features to the end point device (e.g. prioritizing streaming video over e-commerce transactions). Persons of ordinary skill in the art would recognize that the data sub-layer may not only be implemented under the application layer but also may be implemented under any communication protocol layer (e.g. transport, network, datalink, physical, etc.).

Another step in the example method may be generating a connection or tunnel, as shown in block 1312, by a network element using a communication software application that is part of the network element's software platform. The network element may be a primary server or a secure access node. Examples of tunneling technology that may be used by the communication software applications may include, but are not limited to, Generic Routing Encapsulation (GRE), Layer 2 Tunneling Protocol (L2TP), Point-to-Point Tunneling Protocol (PPTP) as well as other plaintext and non-plaintext tunneling protocols. Alternatively, the communication software application may utilize other communication software technologies to generate aspects of a virtual network for a particular service. These communication technologies may include Multiprotocol Label Switching (MPLS) technology or other communication technology that generates and maintains a connection using either a circuit-switched or packet-switched technology.

An additional step in the example method may be reducing cross-service interference, as shown in block 1316, using a service segregation engine that is part of a network element's software platform. The network element may be either a primary server or a secure access node. For example, the segregation engine may reduce cross-service interference by preventing an energy management service provider from shutting off an alarm or sensor as part of a premises security system.

Figure 13B:
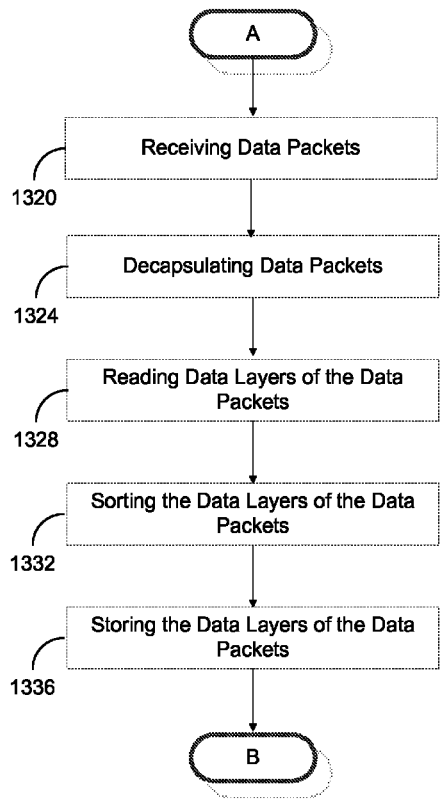

Referring to FIG. 13B, the example method may include receiving data packets by a primary server or secure access node through one or more communication interfaces, as shown in block 1320. The data packets may be stored in a storage device within the primary server or secure access node. A further step in the example method may be decapsulating the data packets, as shown block 1324, using an inspection software application of a deep packet inspection engine residing on the primary server or secure access node as part of a software platform. Decapsulating may include separating the data from each communication data layer (e.g. physical, datalink, network, transport, application, etc.) of the data packet. An additional step in the example method may be reading data from the different layers of the decapsulated data packet, as shown in block 1328, using a reader software application of the deep packet inspection engine residing on the primary server or secure access node. Another step in the example method may be sorting the data from the different layers of the decapsulated data packet into different categories using a sorting software application of the deep packet inspection engine, as shown in block 1332. Further, the sorting software application may store the sorted data in a storage device according to different categories, as shown in block 1336. The storage device may have different memory subcomponents such that each category of sorted data may be stored in a different memory subcomponent.

Figure 13C:
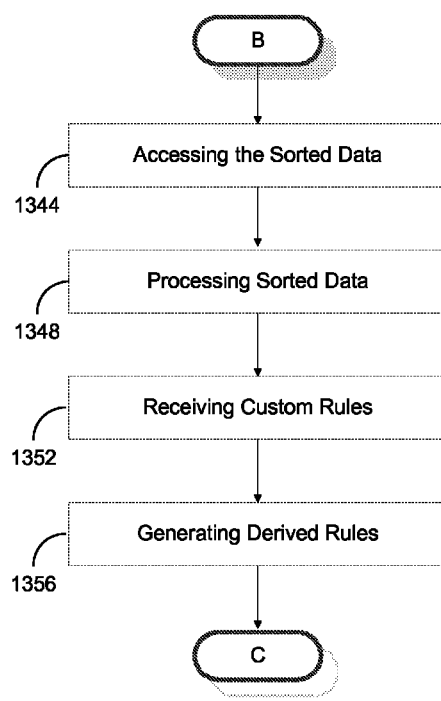

Referring to FIG. 13C, the example method may include accessing sorted data from the different memory subcomponents within a storage device, as shown in block 1344, using an analyzing software application of a rules generation engine that is part of a primary server's or secure access node's software platform. A further step in the example method may be processing the sorted data to determine end point device behavior, as shown in block 1348. For example, the analyzing software application may access the sorted data and determine that an end point device such as a home computer does not conduct e-commerce between 9 am-5 pm on most days.

An additional step in the example method may be receiving custom rules from user software application that may be part a rule generation engine through a user interface of the primary server or secure access node, as shown block 1352. For example, a custom rule may be to allow e-commerce activity between 9 am-5 pm on weekends. Another step in the example method may be generating derived rules using a rule generator software application that may be part of the rule generation engine, as shown in block 1356. The derived rules may be generated based on the analysis of the sorted data provided by an analyzing software application and based on the received custom rules. An exemplary derived rule may be preventing e-commerce activity between 9 am-5 pm on weekdays. Note that custom rules and derived rules may be called services rules collectively.

Figure 13D:
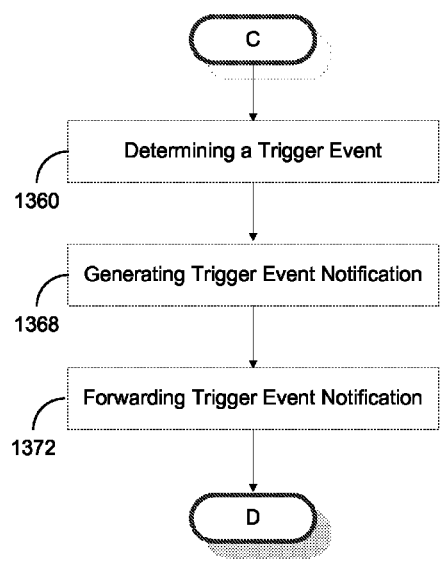

Referring to FIG. 13D, the example method may include determining a trigger event using a rule check software application of a rule check and notification generation software application that may be part of a primary server's or secure access node's software platform, as shown in block 1360. The rule check software application may access received data from data packets as well as the service rules from a storage device. A trigger event may be determined based on the received data and/or service rules. For example, a service rule may be obtained by the rule check software application that states no e-commerce activity may be conducted between 9 am-5 pm on weekdays on a particular end point device. However, the rule check software application also obtains data from received data packets that shows the particular end point device is conducting e-commerce activity at 10:03 am on a Monday. Thus, the rule check software application may determine and generate a trigger event based on e-commerce activity is being conducted during a prohibited time according to the service rule.

A further step in the example method may be generating a trigger event notification using a notification generator software application as part of the rule check and notification generation software application, as shown in block 1368. For example, based on the exemplary trigger event based on prohibit e-commerce conduct by an end point device, the notification generator software application generates an exemplary trigger event notification that may state "Warning: Prohibited E-Commerce Activity Conducted." An additional step in the method may be forwarding the trigger event notification to a user output software application that is part of the rule check software application, as shown in block 1372. The user output software application may display the trigger event notification to a user through a user interface.

Based upon such systems, devices, and methods for providing multiple services to premises over communication networks and that the architecture may engender a cooperative behavior among the service providers along with the system manufacturer, a business model (e.g. one or more business processes) may be provided that incentivizes and compensates participating parties. The primary service provider may be compensated for providing the communications infrastructure as shown in the associated figures and described in the present disclosure to each of the secondary service providers which is typically based on each secondary service's use of the communications infrastructure. Thus, compensation can come in the form of revenue sharing from each of the service providers based on their monthly or annual subscription fees as well as additional revenues that each service provider obtains from advertising, e-commerce, etc. Further, the compensation to a system manufacturer may be a portion of such revenue from the primary service provider based upon the analytical data and cross-service data that is generated by the systems, devices, and methods implemented by system manufacture equipment and may thus continuously be improved upon for the purpose of further enhancing the end user experience Cross-service data is information that may be gathered at any data layer (e.g. physical, datalink, network, transport, application, etc.) from different services and may be provided to a separate distinct service. The above-mentioned business processes can co-exist with the usual license fee and annual maintenance fee used for most products.

A system may run software that is used to collect data from all the connected services. For example, an electronic commerce system may take the user's request for a good or service, may poll the system for general status information data and may also retrieves the user's stored profile (cookie) associated with the electronic commerce system that includes past buying history and other learned history. The electronic commerce system may then run an algorithm that first removes any mismatches between offered available goods or services in the electronic commerce system's available goods and services and the requested good or service parameters (explicit criteria) in addition to known environmental factors from system data and the user profile (implicit criteria). Next, the goods or services that meet the user's explicit and implicit criteria may be prioritized based on other factors that are taken from secure access node data and a user profile. The selected goods or services with their associated advertisements may be presented to the user. The advertisements are logged for collecting a fee and the user's profile may be updated to enhance future prioritizations.

If the user selects a specific good or service for purchase, the purchase may be logged for collecting a commission, the user profile may be updated and the relevant and not private criteria (e.g. price, delivery, installation, warranty, maintenance contracts, features, etc. for males, females, home owners, renters, of different age groups, that watch certain TV channels, that use the electronic commerce system at specific times, have home security systems, home energy management systems, etc.) in the selection is fed to a common data base. The common data base may be used by the system manufacturer (e.g. manufacturer of the secure access node or primary server software) to identify trends (e.g. demographic) used in weighting the prioritization algorithm vectors for specific goods or services selections which is done off line by an electronic commerce system vendor. Electronic commerce logged advertising and sales may be tallied periodically so that purveyors of goods or services can be billed and so that the electronic commerce system vendor can be paid.

Systems may include a Video Service Multiplexer (VSM) whereby, microsegmented advertising can be implemented. The video service multiplexer permits advertisements that are pertinent to specific groups of users to be downloaded to the VSM of each group. When appropriate time slots that permit substitution become available on the content delivery system (e.g. Cable TV channel being viewed), a substitution can be made. This mechanism allows a single time slot to be used with different advertisements to different groups of viewers at the same time. For example, apartment dwellers may receive advertisements for renters insurance and home owners may receive different advertisements for homeowner's insurance. The end user satisfaction is increased by only seeing pertinent advertisements and the content distributer can re-sell the same time slot repeatedly for the same value as the value in general of any advertisement is relative to its potential market not the total audience.

Figure 14:
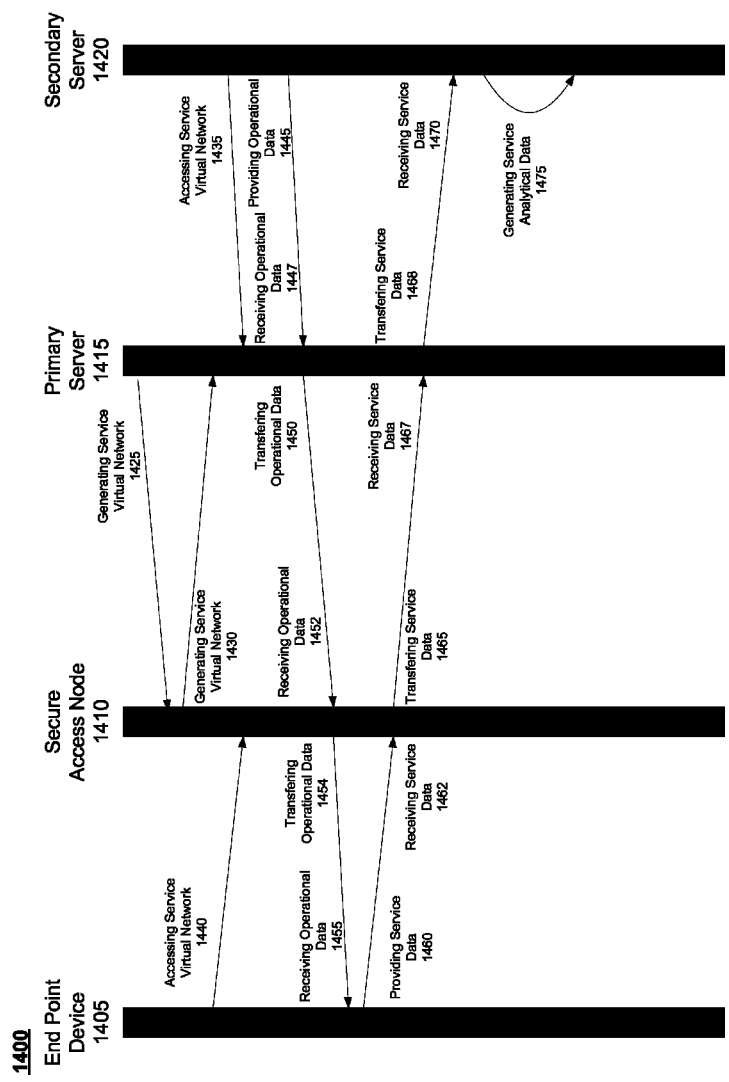
FIGS. 14-16 are exemplary transaction diagrams that show example systems, devices and methods for providing a plurality of services to premises over one or more communication networks.

FIG. 14 is an exemplary transaction diagram 1400 that shows example systems, devices and methods for providing a plurality of services to premises over one or more communication networks. The diagram includes functional blocks that represent an end point device 1405, a secure access node, 1410, a primary server 1415, and a secondary server 1420. Persons of ordinary skill in the art would recognize that the configuration of the transaction diagram in FIG. 14 is exemplary and that a primary server may be coupled to one or more secure access nodes and one or more secondary servers. Further, each secure access node may be coupled to one or more end point devices.

FIG. 14 further shows exemplary transactions performed by one or more network nodes, namely the end point device 1405, the secure access node, 1410, the primary server 1415, and the secondary server 1420. A first transaction may be generating a service virtual network 1425 by the primary server 1415 using one or more primary server software applications. The service virtual network may carry one or more primary services provided by the primary server (owned, controlled or managed by a primary service provider) to different end point devices across different communication networks. Alternatively, service virtual network may carry one or more secondary services provided by a secondary server (owned, controlled or manage by a secondary service provider). Subsequently, the one or more secure access nodes (each secure access node may be residing in a different customer premises) may also generate or establish a service virtual network 1430 with the primary server 1415. Once the service virtual network is established for a service, the service virtual network may incorporate aspects of the service virtual network described in the present disclosure. This may include segregating the service carried by the service virtual network from other services in different service virtual networks spanning the primary server 1415 and the secure access node 1410.

Further, the service virtual network may provide one or more communication interfaces for the service virtual network residing on different network devices. The communication interfaces may be hardware interfaces such as ether port, USB, WiFi, WiMax, Bluetooth, etc. or software that allows the primary server 1415 or secondary server 1420 as well as the secure access node 1410 and the end point device 1405 to access the service virtual network from any one data layer or a combination of data layers as known to those skilled in the art and as described in the present disclosure. Each access point may be considered a service virtual network communication interface. Thus, there may be an end point service virtual network communication interface, a secure access node service virtual network communication interface, a primary server service virtual network communication interface, and a secondary server service virtual network communication interface. Data layers may include the physical layer, the datalink layer, the network layer, the transport layer, the application layer. For example, the service virtual network may provide an adaption layer as part of the service virtual network at the application layer, or alternatively, at the network layer depending on the circumstances (network status, type of service, etc.). Thus, another transaction depicted in FIG. 14 may be a secondary server 1420 accessing the service virtual network 1435 provided by the primary server 1420 and the secure access node 1410 using a server virtual network communication interface. A secondary server function may control at least in part the server virtual network communication interface. In addition, the end point device 1405 may access the service virtual network 1440 using an end point virtual network communication interface.

Once the secondary server 1420 has accessed or been logically coupled to the service virtual network via the server virtual network communication interface controlled by a service virtual network secondary server function, the secondary server may provide operational data for the service carried by the service virtual network 1445. Accordingly, the primary server 1415 may receive the operational data from the secondary server 1447. The primary server 1415 may then transfer the operational data 1450 from the primary server 1415 to the secure access node 1410. Accordingly, the secure access node 1410 may receive the operational data 1452 from the primary server 1415. The secure access node, may in turn, transfer operational data 1454 to the end point device 1405. Consequently, the operational data may be received 1455 by the end point device 1405.

In addition, the end point device 1405 may provide service data 1460 destined for the secondary server 1420 to the secure access node 1410 which receives the service data 1462, accordingly, and transfers the service data 1465 to the primary server 1415. The service data may be received 1467 by the primary server 1415 and then transfer the service data 1468 to the secondary server 1420. The secondary server 1420 may receive the service data 1470 and then process the service data 1475 to provide additional service features or configuration data to the end point device 1405. Note, that the transactions for providing, receiving and transferring operational data shown in FIG. 14 as well as the providing, receiving, and transferring service data are carried by the service virtual network.

Figure 15:
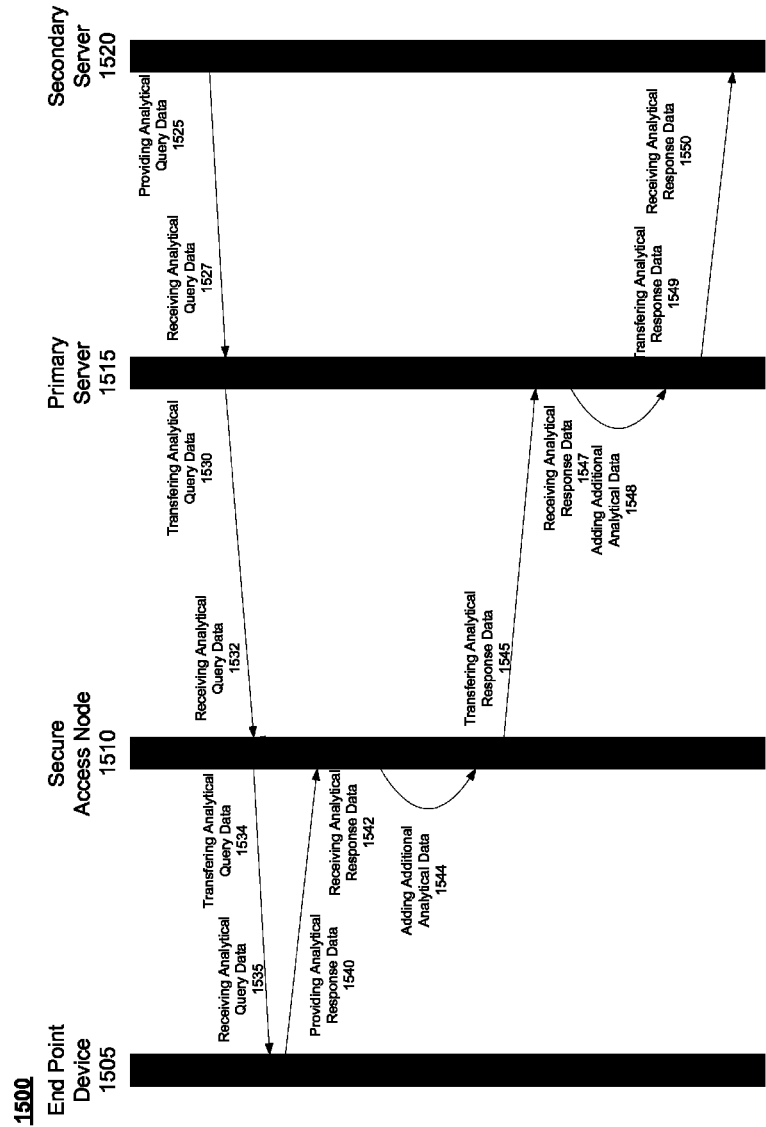

FIG. 15 is an exemplary transaction diagram 1500 that shows example systems, devices and methods for providing a plurality of services to premises over one or more communication networks. The diagram includes functional blocks that represent an end point device 1505, a secure access node, 1510, a primary server 1515, and a secondary server 1520. Persons of ordinary skill in the art would recognize that the configuration of the transaction diagram in FIG. 15 is exemplary and that a primary server may be coupled to one or more secure access nodes and one or more secondary servers. Further, each secure access node may be coupled to one or more end point devices.

A secondary service provider may request analytical information from an end point device 1505 using a secondary server 1520. The end point device 1505 may provide analytical information in response to the secondary service provider request. The secondary service provider may process the analytical information using the secondary server 1520 to provide additional service features or reconfiguration data to the end point device 1505. For example, secondary service provider by the secondary server 1520 may be streaming media provider that streams movies, television shows, and other media to a computer or television end point device 1505. Further, the end point device may have analytical information that may include a recent science fiction television show viewed or recent searches to movie websites for the most recent science fiction thriller playing at a local theater. The end point device 1505 may provide such analytical information upon request by the secondary server 1520 so that the secondary server 1520 may advertise science fiction content that the secondary server 1520 may stream to the end point device 1505.

Thus, FIG. 15 shows the exemplary transactions for the secondary server 1520 requesting analytical information and the end point device 1505 responding to the request. Further, FIG. 15 shows the transactions performed by the primary server 1515 and the secure access node 1510.

Before the transactions shown in FIG. 15 are performed, a service virtual network may be generated and established as discussed in describing FIG. 14. Thereafter, the secondary server 1520 may provide analytical query data 1525 destined for the end point device 1505 to request analytical information. The primary server 1515 may receive the analytical query data 1527 and transfer the analytical query data 1530 to the secure access node 1510. Moreover, the secure access node 1510 may receive the analytical query data 1532 and transfer the analytical query data 1534 to the end point device 1505 which in turn receives the analytical query data 1535.

The end point device 1505 may provide analytical response data 1540 destined for the secondary server 1520 after receiving or in response to the analytical query data. The secure access node 1510 may receive the analytical response data 1542 and transfers the analytical response data 1545 to the primary server 1515. Prior to transfer the secure access node 1510 may analyze and process the analytical response data 1544 sent by the end point device 1505. Accordingly, the secure access node 1510 may add additional analytical response data based on the above analysis and processing 1544. Moreover, the primary server 1515 may receive the analytical response data 1547 and transfers the analytical response data 1549 to the secondary server 1525 which in turn receives the analytical response data 1550. Prior to transfer, the primary server 1515 may analyze and process the analytical response data 1548 sent by the secure access node 1510. Accordingly, the primary server 1515 may add additional analytical response data as well as cross-service functional data based on the above analysis and processing 1548.

Figure 16:
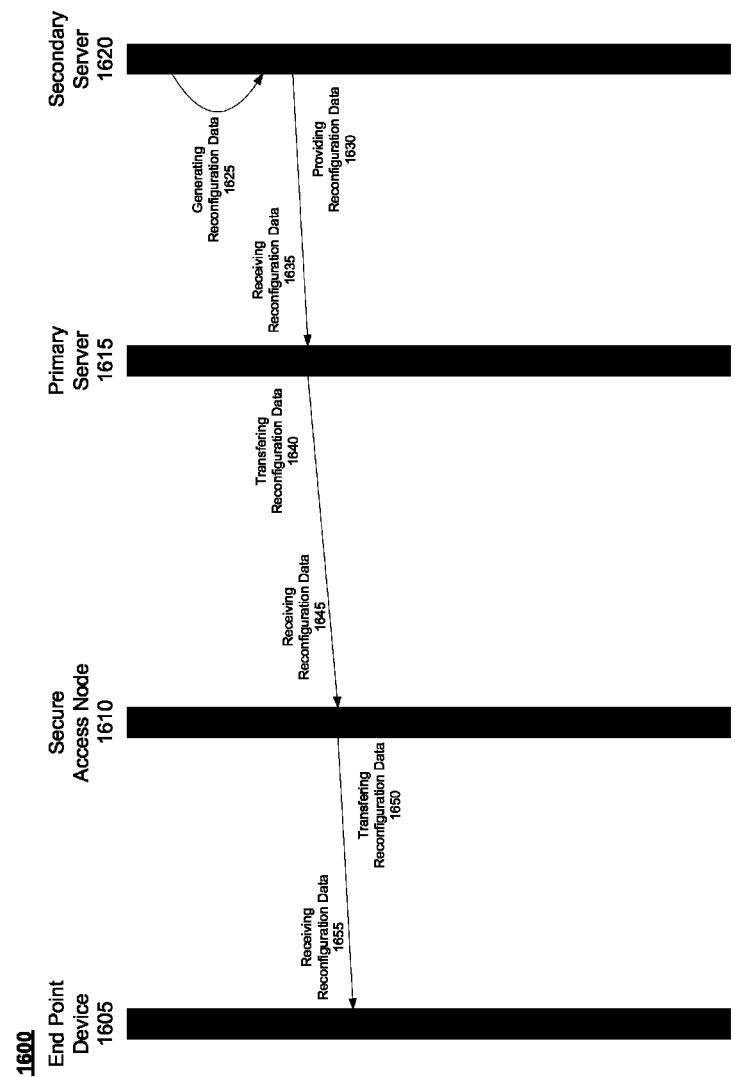

FIG. 16 is an exemplary transaction diagram 1600 that shows example systems, devices and methods for providing a plurality of services to premises over one or more communication networks. The diagram includes functional blocks that represent an end point device 1605, a secure access node, 1610, a primary server 1615, and a secondary server 1620. Persons of ordinary skill in the art would recognize that the configuration of the transaction diagram in FIG. 16 is exemplary and that a primary server may be coupled to one or more secure access nodes and one or more secondary servers. Further, each secure access node may be coupled to one or more end point devices.

As shown and described in FIG. 15, a secondary server may receive end point device analytical information. Further, the secondary server may process the analytical information and determine to send reconfiguration data destined for the end point device to reconfigure the end point device. For example, the secondary server may be operated by an e-commerce website and the end point device may be a computer. Analytical information may show that parental controls are set on the computer to inhibit children in the evening hours to purchase from the e-commerce website. However, one evening parental controls have not been set during the evening hours. The secondary server may process the analytical information and then determine to provide reconfiguration data to the end point device to institute parental controls on the e-commerce website as is customary.

Before the transactions shown in FIG. 16 are performed, a service virtual network may be generated and established as discussed in describing FIG. 14. Thereafter, the secondary server 1620 may generate reconfiguration data 1625 based on analytical data received from the end point device 1605. Further, the secondary server 1620 may provide the reconfiguration data 1630 to the primary server 1615. Consequently, the primary server 1615 may receive the reconfiguration data 1635 and transfer the reconfiguration data 1640 to the secure access node 1610. Moreover, the secure access node 1610 may receive the reconfiguration data 1645 and transfer the reconfiguration data 1650 to the end point device 1605. The reconfiguration data may be received 1655 by the end point device 1605 and may process to provide the additional service features or other functions as directed by the reconfiguration data.

Figure 17:
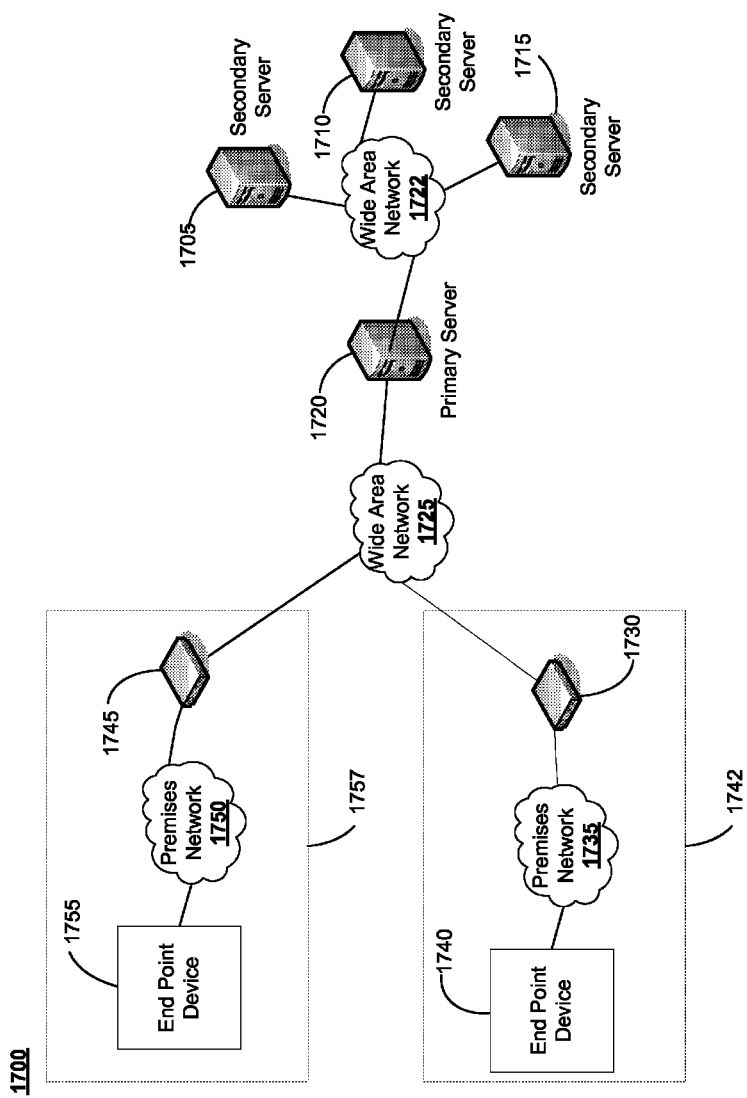
FIG. 17 is an exemplary network architecture for providing a plurality of services to premises over one or more communication networks.

FIG. 17 is an exemplary network architecture 1700 for providing a plurality of services to premises over one or more communication networks. The systems, devices, nodes, and communication networks shown in FIG. 17 may be similar to the systems, devices, nodes, and communication networks shown in FIG. 1 and as described in the present disclosure. The exemplary network architecture 1700 can support different services including generating, transferring, and managing advertisements for a primary service provider as well as one or more secondary service providers. The exemplary network architecture 1700 may include a secondary server 1705, secondary server 1710, and secondary server 1715. Each secondary server (1705, 1710, and 1715) may be coupled to a primary server 1720 through a wide area network (WAN) 1722. Further, each secondary server (1705, 1710, and 1715) may be owned and operated by a different secondary service provider and the primary server 1720 may be owned and operated by a primary service provider. For example, a secondary server 1705 may be owned and operated by an e-commerce service provider while secondary servers (1710 and 1715) may each be owned and operated by different cable content providers (e.g. Netflix, Amazon, etc.). Additionally, the primary server 1720 may be owned and operated by a cable service provider. Such a cable service provider may provide cable television services as well as Internet services to customer premises.

As shown in FIG. 17, the network architecture 1700 includes the primary server 1722 coupled to two secure access nodes (1730 and 1745) across a wide area network 1725, each secure access node (1730 and 1745) may be located in a different customer premises (1742 and 1757). Persons of ordinary skill in the art would recognize that the primary server 1720 coupled to two secure access nodes (1730 and 1745) is exemplary and that the primary server 1720 may be coupled to several more secure access nodes, if need be, across the wide area network 1725.

In one customer premises 1742, the secure access node 1730 may be coupled to an end point device 1740 across a premises network 1735. Persons of ordinary skill in the art would recognize that the secure access node 1720 coupled to the end point device 1740 is exemplary and that the secure access node 1730 may be coupled to several more end point devices, if need be, across the premises network 1735.

In the other customer premises 1757, the secure access node 1745 may be coupled to an end point device 1755 across a premises network 1750. Persons of ordinary skill in the art would recognize that the secure access node 1745 coupled to the end point device 1755 is exemplary and that the secure access node 1745 may be coupled to several more end point devices, if need be, across the premises network 1750.

The exemplary network architecture 1700 shown in FIG. 17 may depict, for example, one customer premises 1742 to be one residence with the end point device 1740 being a computer providing streaming media services and content to a first user. Alternatively, the other customer premises 1757 may be another residence such that the end point device 1755 may also be a computer providing streaming media services and content to a second user. Continuing with the example, the primary server 1720 may be a cable service provider that is coupled to the end point devices (1740 and 1755) via the wide area network 1725 as well as the respective secure access nodes (1730 and 1745) and premises networks (1735 and 1750). Further, the secondary server 1710 may be a first streaming media content provider and the secondary server 1715 may be a streaming media content provider.

The primary server 1720 may access analytical information from each end point device (1740 and 1755) through their respective secure access nodes (1730 and 1745), premises networks (1735 and 1750) and the wide area network 1725. The primary server 1720 may pass the analytical information to secondary server 1710 that that is a Netflix server and secondary server 1715 that is an Amazon server to the cable service provider, for example. The analytical information may show that one end point device 1740 has a propensity of showing foreign films to the first user. Alternatively, the analytical information may show that one end point device 1755 has a propensity of showing comedy films to the second user. The secondary server 1710 (e.g. Netflix) and the secondary server 1715 (e.g. Amazon) may generate and provide advertisements for the end point devices 1740 and 1755 for their respective content. For example, secondary server 1710 might have more foreign film content than secondary server 1715, however, secondary server 1715 might have more comedy film content than secondary server 1710. Consequently, the secondary server 1710 may provide a foreign film advertisement to the primary server 1720 and the secondary server 1715 may provide a comedy film advertisement to the primary server 1720. Further, the primary server 1720 (cable service provider server) may then manage the advertisements to route the foreign film advertisement from secondary server 1710 to the end point device 1740 during a certain time slot during user viewing and the comedy film advertisement from secondary server 1715 to the end point device 1755 during the same time slot. Thus, the network architecture 1700 including the systems, devices, nodes, and networks shown in FIG. 17 supports targeted advertisements to be displayed on multiple end point devices during the same time slot. Alternatively, the primary server (cable service provider server) may generate and provide an advertisement to the first user such as discount rates for different foreign film movie packages offered by the cable service provider, for example.

Figure 18:
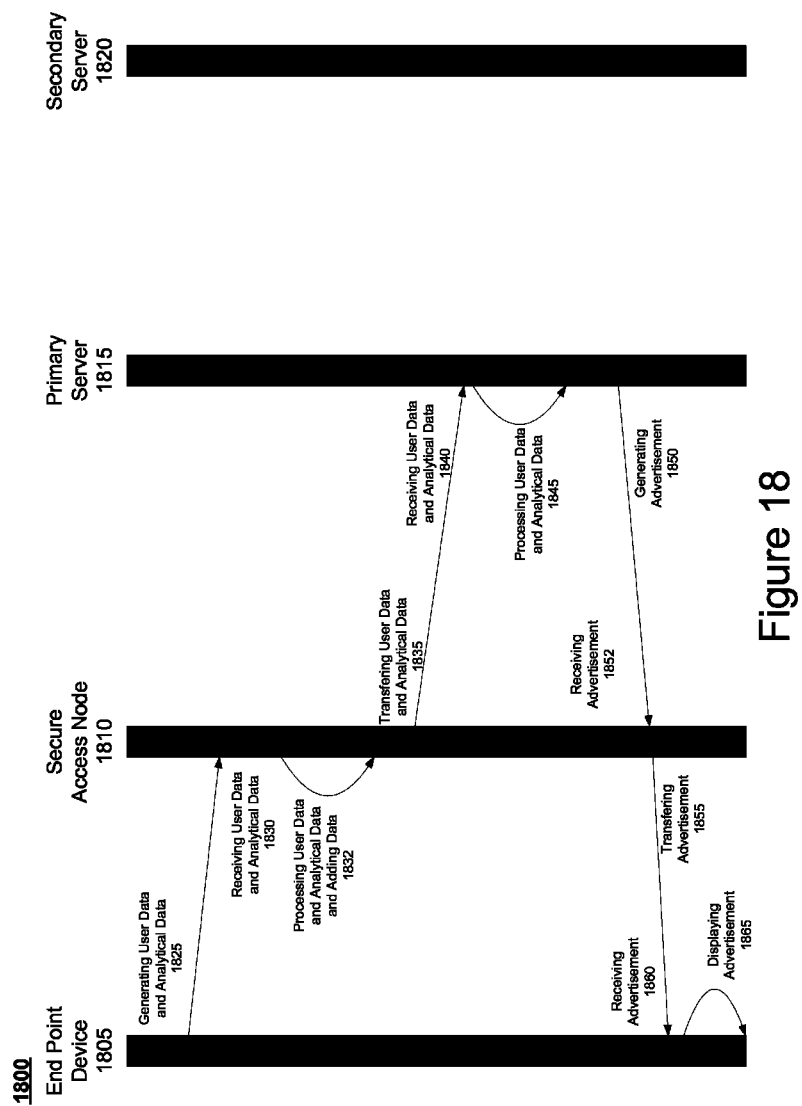
FIGS. 18 and 19 are exemplary transaction diagrams that show example systems, devices and methods for providing a plurality of services to premises over one or more communication networks.

FIG. 18 is an exemplary transaction diagram that shows example systems, devices and methods for providing a plurality of services to premises over one or more communication networks. The diagram includes functional blocks that represent an end point device 1805, a secure access node, 1810, a primary server 1815, and a secondary server 1820. Persons of ordinary skill in the art would recognize that the configuration of the transaction diagram in FIG. 18 is exemplary and that a primary server may be coupled to one or more secure access nodes and one or more secondary servers. Further, each secure access node may be coupled to one or more end point devices.

A first transaction shown in FIG. 18 may be an end point device, such as a set top box-television combination, generating user data and analytical data 1825. The user data may include user preferences inputted by the user into the set top box or other configuration information. Analytical data may include the programming preferences by the user for cable television programming. Further, the end point device 1805 may provide the user data and analytical data to the secure access node 1810. Further, the secure access node 1810 may receive the user data and analytical data 1830 from the end point device 1805 and may transfer the user data and analytical data 1835 to the primary server 1815. However, before transfer, the secure access node processes the received data and may add additional data 1832. The additional data may be cross-service functional user data and other cross-service functional data such as from e-commerce service provider. The primary server 1815 may receive the user data and analytical data 1840. Moreover, the primary server 1815 may process the user data and analytical data 1845 received from secure access node and generate an advertisement 1850 based on the user data and analytical data. For example, the primary server 1815 may be a cable service provider server. The primary server may process the user data and analytical data to determine that the user of the end point devices has a propensity to view movie programming. Consequently, the primary server 1815 may generate an advertisement of different movie packages offered by the cable service provider, for example. The primary server 1815 may provide the advertisement to the secure access node 1810. Further, the secure access node 1810 may receive the advertisement 1852 and transfer the advertisement 1855. In addition, the end point device 1805 may receive the advertisement 1860 and display the advertisement 1865. The advertisement may be displayed according to instructions conveyed by the primary server 1815.

Figure 19:
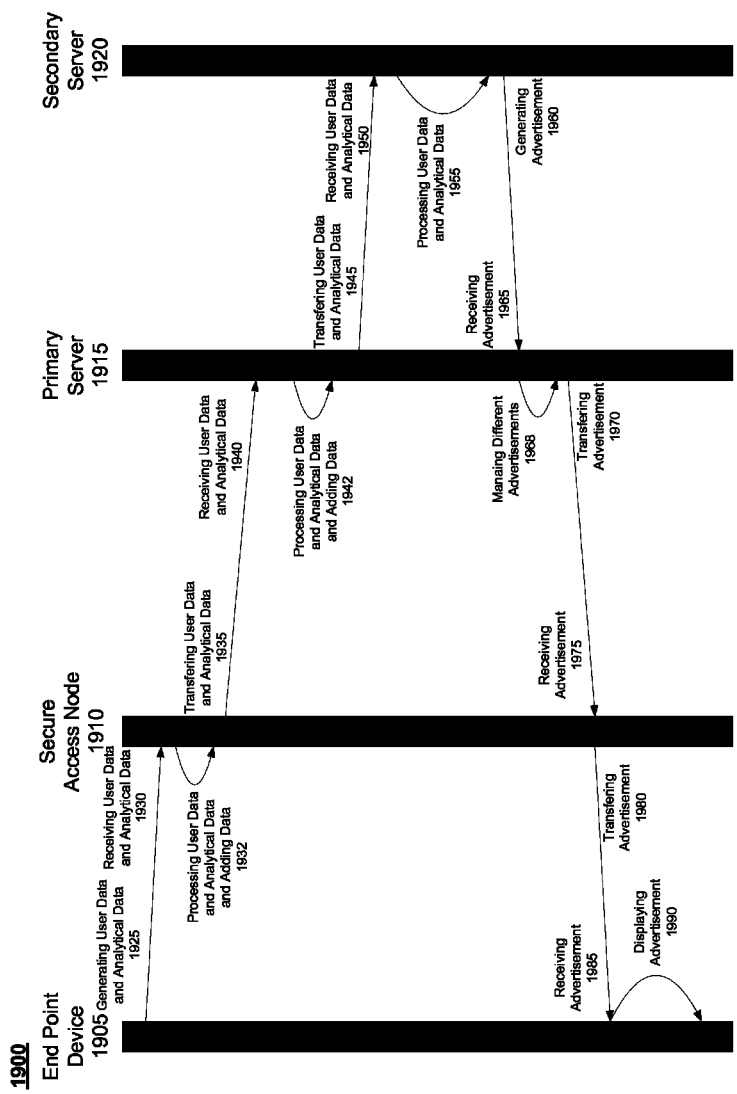

FIG. 19 is an exemplary transaction diagram that shows example systems, devices and methods for providing a plurality of services to premises over one or more communication networks. The diagram includes functional blocks that represent an end point device 1905, a secure access node, 1910, a primary server 1915, and a secondary server 1920. Persons of ordinary skill in the art would recognize that the configuration of the transaction diagram in FIG. 19 is exemplary and that a primary server may be coupled to one or more secure access nodes and one or more secondary servers. Further, each secure access node may be coupled to one or more end point devices.

A first transaction shown in FIG. 19 may be an end point device, such as a set top box-television combination, generating user data and analytical data 1925. Such a set-top-television combination may have a capability of receiving and displaying streaming media from one or more secondary service providers. The user data may include user preferences inputted by the user into the set top box or other configuration information. Analytical data may include the viewing preferences by the user for streaming media. Further, the end point device 1905 may provide the user data and analytical data 1925 to the secure access node 1910. In addition, the secure access node 1910 may receive the user data and analytical data 1930 from the end point device 1905 and may transfer the user data and analytical data 1935 to the primary server 1915. Before transfer, the secure access node may process the received data and add additional data such as cross-service functional user data and other cross-service functional data such as from e-commerce service provider 1932. The primary server 1915 may receive the user data and analytical data 1940 and transfer the user data and analytical data 1945. Before transfer, the primary server may process the received data and add additional data such as cross-service functional user data and other cross-service functional data such as from or for an e-commerce service provider 1942. The secondary server 1920 may receive the user data and analytical data 1950. Moreover, the secondary server 1920 may process the user data and analytical data 1955 and generate an advertisement 1960 based on the user data and analytical data. For example, the secondary server 1920 may be a streaming media provider such as Netflix. The secondary server 1920 may process the user data and analytical data to determine that the user of the end point devices has a propensity to view certain types of films (e.g. drama, comedy, action, foreign, etc.). Consequently, the secondary server 1920 may generate an advertisement for streaming media content offered by the streaming media provider, for example. The advertisement may be provided to, and received by 1965, the primary server 1915 which may be a cable service provider server. The primary server may receive several different advertisements from different cable content providers. Consequently, the primary server 1915 may manage the advertisements from different content providers (e.g. streaming media, etc.) 1968, for example. As part of managing the advertisements, the primary server 1915 may select the appropriate advertisement from a particular cable content provider for the specific end point device 1905 and the time slot to instruct the end point device to display the advertisement. Once the primary server 1915 selects the advertisement for the end point device 1905, the primary server 1915 may transfer the advertisement 1970 to the secure access node 1910. Further, the secure access node 1910 may receive the advertisement 1975 and transfer the advertisement 1980. In addition, the end point device 1905 may receive the advertisement 1985 and display the advertisement 1990. The advertisement may be displayed according to instructions (e.g. time slot, etc.) conveyed by the primary server 1915.

Figure 20:
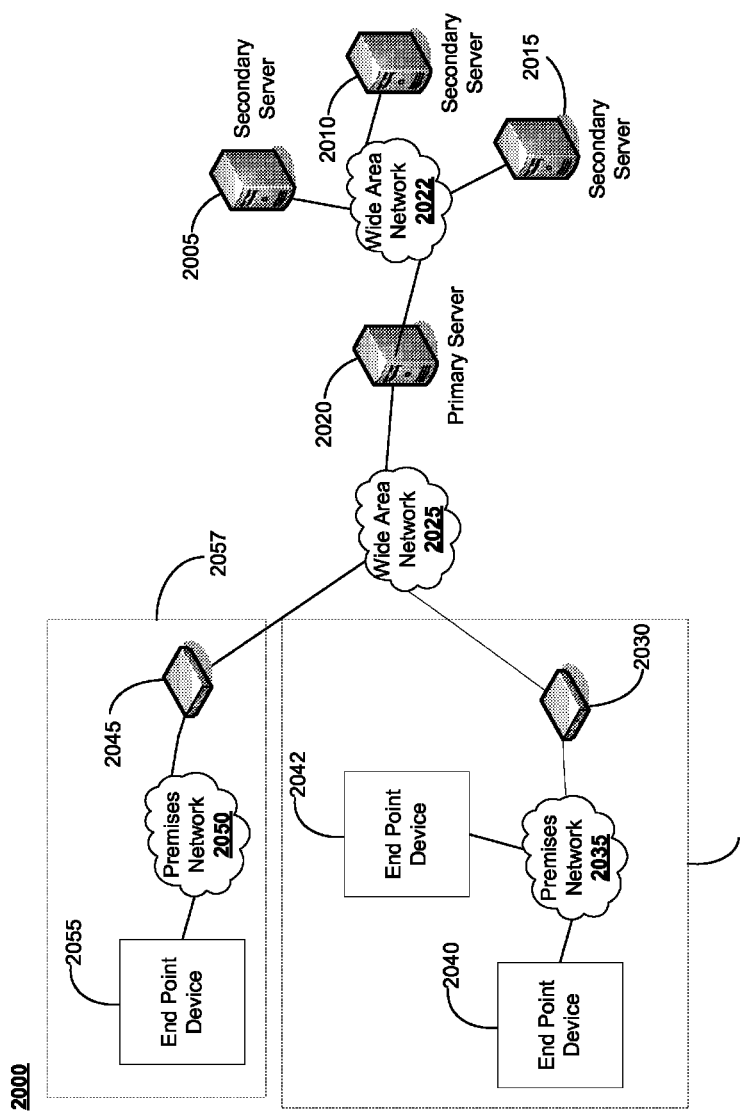
FIG. 20 is an exemplary network architecture for providing a plurality of services to premises over one or more communication networks.

FIG. 20 is an exemplary network architecture 2000 for providing a plurality of services to premises over one or more communication networks. The systems, devices, nodes, and communication networks shown in FIG. 20 may be similar to the systems, devices, nodes, and communication networks shown in FIG. 1 and as described in the present disclosure. The exemplary network architecture 2000 can support different services including a primary service provider collecting service data and analytical data from several different end point devices, processing the service data and analytical data by a primary server 2020 owned and operated by the primary service provider, and providing cross-service functions to one or more secondary service providers based on the service data and analytical data.

The exemplary network architecture 2000 may include a secondary server 2005, secondary server 2010, and secondary server 2015. Each secondary server (2005, 2010, and 2015) may be coupled to a primary server 2020 through a wide area network (WAN) 2022. Further, each secondary server (2005, 2010, and 2015) may be owned and operated by a different secondary service provider and the primary server 2020 may be owned and operated by a primary service provider. For example, a secondary server 2005 may be owned and operated by an e-commerce service provider, secondary server 2010 may be owned and operated by an energy management provider, and secondary server 2015 may be owned and operated by a premises security provider. Additionally, the primary server 2020 may be owned and operated by an Internet service provider. Such an Internet service provider may provide Internet services to customer premises.

As shown in FIG. 20, the network architecture 2000 includes the primary server 2020 coupled to two secure access nodes (2030 and 2045) across a wide area network 2025, each secure access node (2030 and 2045) may be located in a different customer premises (2044 and 2057). Persons of ordinary skill in the art would recognize that the primary server 2020 coupled to two secure access nodes (2030 and 2045) is exemplary and that the primary server 2020 may be coupled to several more secure access nodes, if need be, across the wide area network 2025.

In one customer premises 2044, the secure access node 2030 may be coupled to an end point device 2040 and an end point device 2042 across a premises network 2035. Persons of ordinary skill in the art would recognize that the secure access node 2030 coupled to the end point device 2040 and the end point device 2042 are exemplary and that the secure access node 2030 may be coupled to several more end point devices, if need be, across the premises network 2035.

In the other customer premises 2057, the secure access node 2045 may be coupled to an end point device 2055 across a premises network 2050. Persons of ordinary skill in the art would recognize that the secure access node 2045 coupled to the end point device 2055 is exemplary and that the secure access node 2045 may be coupled to several more end point devices, if need be, across the premises network 2050.

End point device 2040 may be an energy management sensor and end point device 2042 may be an alarm (premises security) sensor. The primary server 2020 may collect service data and analytical data from both end point device 2040 and end point device 2042, specifically energy management service information and premises security service information, respectively. The primary server 2020 may process the collected service data and analytical data from both end point devices. Consequently, the primary service may offer cross-service functions to the secondary servers (2005, 2010, and 2015) owned and operated by different secondary service providers. For example, the collected service data and analytical data from the energy management end point device 2040 may indicate that an appliance such as an oven may be on for a prolonged period of time. Further, data from the alarm sensor end point device 2042 may show that the alarm sensor has failed for some reason. Consequently, the primary server 2020 may provide a cross-service function such as an alert or alarm to the premises security server 2015 indicating that there is an alarm sensor failure and a potential fire hazard (oven).

Figure 21:
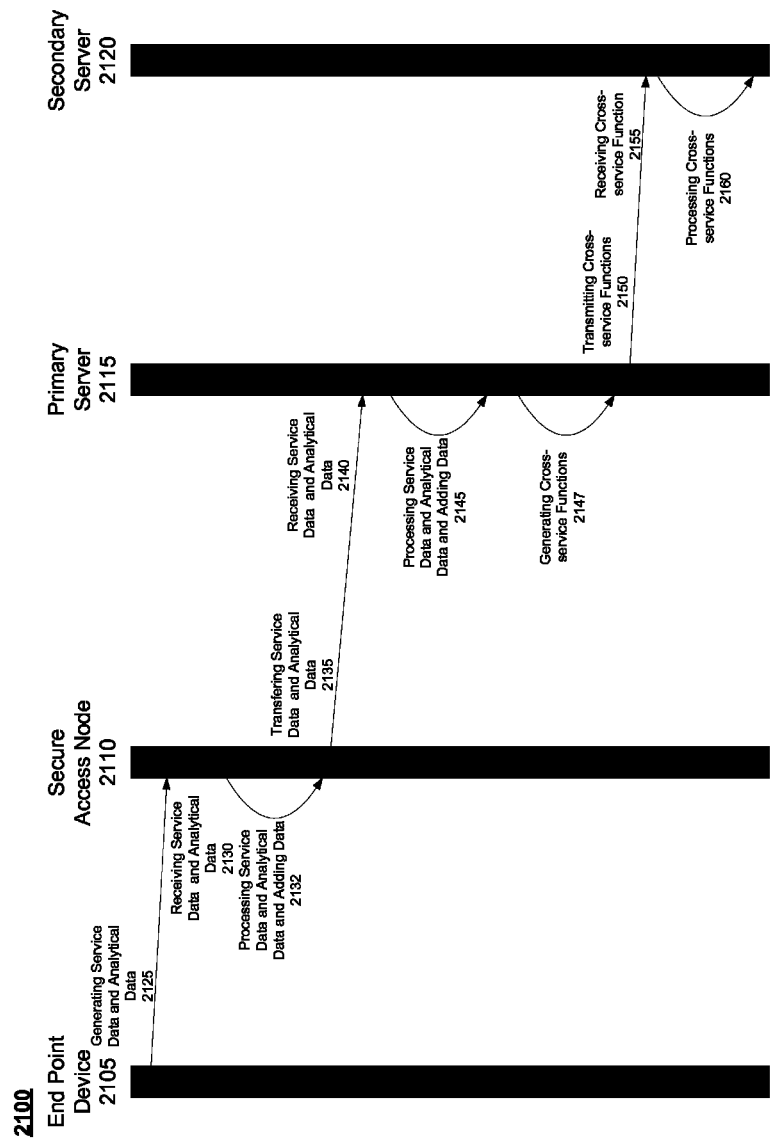
FIG. 21 is an exemplary transaction diagram that shows example systems, devices and methods for providing a plurality of services to premises over one or more communication networks.

FIG. 21 is an exemplary transaction diagram that shows example systems, devices and methods for providing a plurality of services to premises over one or more communication networks. The diagram includes functional blocks that represent an end point device 2105, a secure access node, 2110, a primary server 2115, and a secondary server 2120. Persons of ordinary skill in the art would recognize that the configuration of the transaction diagram in FIG. 21 is exemplary and that a primary server may be coupled to one or more secure access nodes and one or more secondary servers. Further, each secure access node may be coupled to one or more end point devices.

A first transaction shown in FIG. 21 may be an end point device, such as a alarm sensor, generating service data and analytical data 2125. The service data may include service information and configuration information. Analytical data may include the user preferences, end point device status, and other data. Further, the end point device 2105 may provide the service data and analytical data to the secure access node 2110 as shown 2125. Further, the secure access node 2110 may receive the service data and analytical data 2130 from the end point device 2105 and may transfer the service data and analytical data 2135 to the primary server 2115. Before the transfer, the secure access node 2110 may process the service data and analytical data and add data such as cross-service functions 2132 based on the service data and analytical data. The primary server 2115 may receive the service data and analytical data 2140. Moreover, the primary server 2115 may process the service data and analytical data 2145 and generate cross-service functions 2147 based on the service data and analytical data. Moreover, the primary server 2115 may transmit the cross-service function 2150 to the secondary server 2120. Also, the secondary server 2120 may receive the cross-service functions 2155 from the primary server 2115 and process the cross-service function 2160. Based on processing the cross-service functions, the secondary server may take some action. For example, if the secondary server is owned and operated a premises security service provider and receives notification that an alarm sensor (end point device 2105) has failed as well as a potential fire hazard, then the premises security service provider may dispatch a repairmen to repair the alarm sensor as well as notify the fire department or notify a premises owner of the potential fire hazard by providing reconfiguration data to a premises alarm panel which may be an additional end point device (See FIG. 16).

Figure 22:
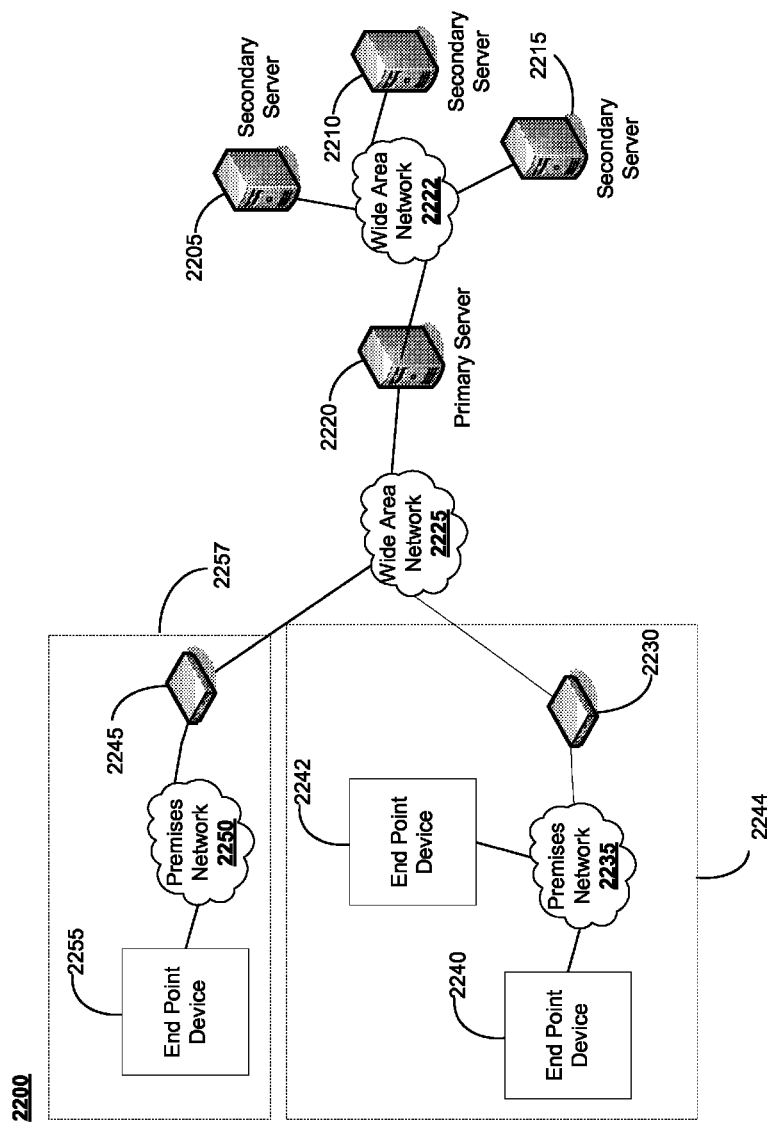
FIG. 22 is an exemplary network architecture for providing a plurality of services to premises over communication networks and associated business processes that are provided by such an exemplary network architecture.

FIG. 22 is an exemplary network architecture 2200 for providing a plurality of services to premises over communication networks and the associated business processes that are provided by such an exemplary network architecture. The systems, devices, nodes, and communication networks shown in FIG. 22 may be similar to the systems, devices, nodes, and communication networks shown in FIG. 1 and as described in the present disclosure. The exemplary network architecture 2200 can support different services. Moreover, business processes may be associated with providing such services by the exemplary network architecture 2200.

The exemplary network architecture 2200 may include a secondary server 2205, secondary server 2210, and secondary server 2215. Each secondary server (2205, 2210, and 2215) may be coupled to a primary server 2220 through a wide area network (WAN) 2222. Further, each secondary server (2205, 2210, and 2215) may be owned and operated by a different secondary service provider and the primary server 2220 may be owned and operated by a primary service provider. For example, a secondary server 2205 may be owned and operated by an e-commerce service provider, secondary server 2210 may be owned and operated by an energy management provider, and secondary server 2215 may be owned and operated by premises security provider. Additionally, the primary server 2220 may be owned and operated by an Internet service provider. Such an Internet service provider may provide Internet services to customer premises.

As shown in FIG. 22, the network architecture 2200 includes the primary server 2222 coupled to two secure access nodes (2230 and 2245) across a wide area network 2225, each secure access node (2230 and 2245) may be located in a different customer premises (2244 and 2257). Persons of ordinary skill in the art would recognize that the primary server 2220 coupled to two secure access nodes (2230 and 2245) is exemplary and that the primary server 2220 may be coupled to several more secure access nodes, if need be, across the wide area network 2225.

In one customer premises 2244, the secure access node 2230 may be coupled to an end point device 2240 and an end point device 2242 across a premises network 2235. Persons of ordinary skill in the art would recognize that the secure access node 2230 coupled to the end point device 2240 and the end point device 2242 are exemplary and that the secure access node 2230 may be coupled to several more end point devices, if need be, across the premises network 2235.

In the other customer premises 2257, the secure access node 2245 may be coupled to an end point device 2255 across a premises network 2250. The end point device 2255 may be a computer that can perform e-commerce transactions. Persons of ordinary skill in the art would recognize that the secure access node 2245 coupled to the end point device 2255 is exemplary and that the secure access node 2245 may be coupled to several more end point devices, if need be, across the premises network 2250.

In FIG. 22, the network architecture 2200 engenders different secondary service providers to cooperate and provide their respective secondary services over the network 2200. Further, the primary service provider may utilize the network architecture 2200 to provide additional services to the secondary service providers and derive revenue based on the network attributes of the network architecture as well as the additional services. For example, the primary service provider may be given a share of revenue received by the secondary service providers by end users of the network 2200 for providing end users with services. The primary service provider and the network architecture 2200 may provide incentive schemes and network attributes that may attract secondary service providers to utilize the network architecture 2200. For example, the primary service provider, through the primary server 2220, may be able to collect analytical data from end point devices for one or more secondary services. Further, the primary service provider may provide cross-service functions based on collected service and analytical data such that the secondary service provider may act in response to received cross-service functions from the primary service provider. In addition, the network itself may have certain network attributes (e.g. number and type of users, network bandwidth, quality of service, number of secure access nodes, etc.). Also, the primary service provider provides support for and manages targeted advertisements for certain secondary service providers (e.g. e-commerce, content, etc.). The primary service provider may generate or receive revenue or fees based on performing the above mentioned actions. Moreover, the primary server may receive a commission from any sale due to any advertisements supported or managed by the primary service provider.

Figure 23A:
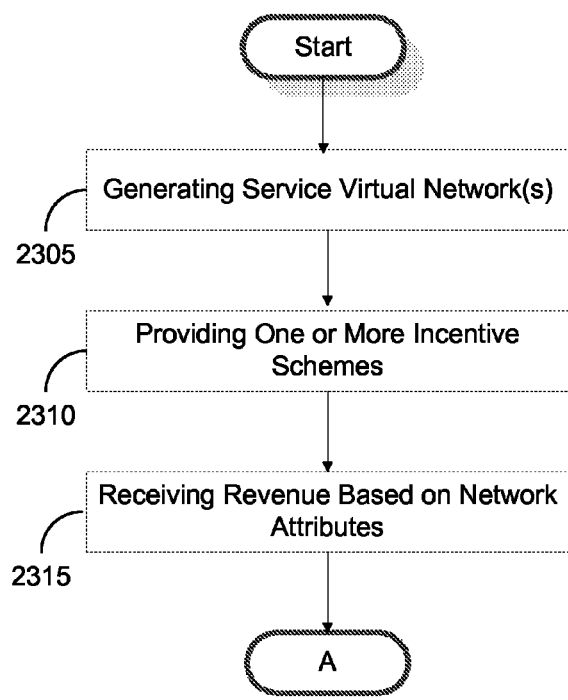
FIGS. 23A-23C are exemplary flowcharts that show example methods for providing a plurality of services to premises over communication networks and associated business processes that are provided by such an exemplary methods.
Figure 23B:
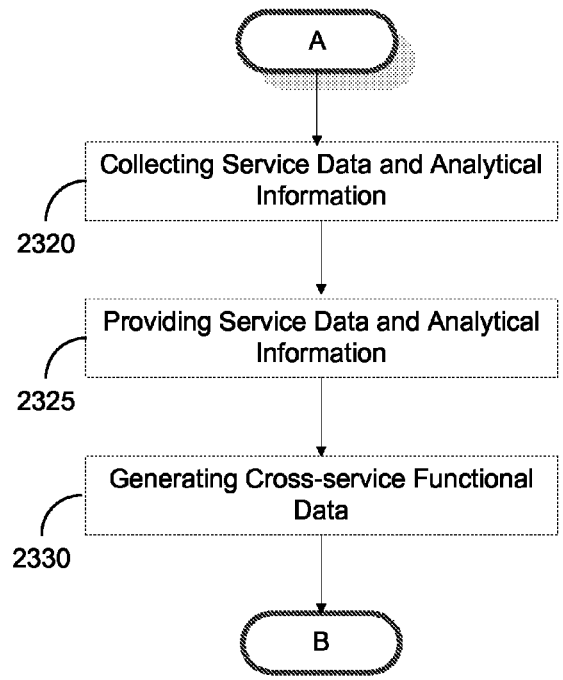
Figure 23C:
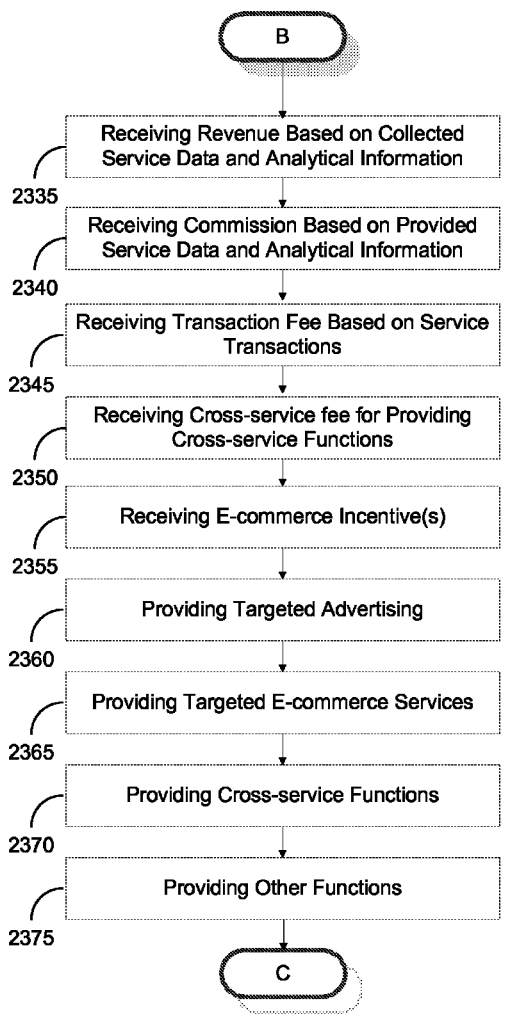

FIGS. 23A-23C are exemplary flowcharts that show example methods for providing a plurality of services to premises over communication networks and the associated business processes that are provided by such exemplary methods. A step in the method may be generating one or more service virtual networks by a primary server and one or more secure access nodes, as shown in block 2305. The primary server and secure access nodes provide service virtual network interfaces to one or more secondary servers and one or more end point devices to access the one or more service virtual networks. Further, a network architecture (see FIG. 22) resulting from the one or more service virtual networks may provide one or more incentive schemes to one or more secondary service providers to offer secondary services over the one or more service virtual networks, as shown in block

2310. Exemplary incentive schemes may include providing a collection of end user, service, and analytical data from one or more end point devices. Further, the capability of segregating services from different service providers thereby reducing cross-service interference offers other incentives. In addition, the ability for a primary service provider that owns and operates a primary server to provide additional or cross-service functions based on collected end user, service, and analytical data from one or more end point devices may be an additional incentive scheme. An additional step in the example method may be a primary service provider receiving revenue based on the network attributes and incentive schemes, as shown in block 2315. Network attributes may include the number and type of end users and end point devices (e.g. network bandwidth, quality of service, number of secure access nodes, etc.).

Referring to FIG. 23B, another step in the example method may be a primary server collecting service data and analytical information from one or more end point devices, as shown in block 2320. A further step in the method may be providing the service data and analytical information to one or more secondary service providers by the primary server, as shown in block 2325. An additional step in the method may be a primary server providing cross-service functional data to one or more secondary service providers based on collected service data and analytical information, as shown in block 2330.

Referring to FIG. 23C, another step in the method may be a primary service provider receiving revenue based on collected service data and analytical information, as shown in block 2335. A further step in the method may be a primary service provider receiving a commission based on providing service data and analytical information to one or more secondary service providers, as shown in block 2340. An additional step may be the primary service provider receiving a transaction fee based on service transactions enacted by one or more secondary service providers, as shown in block 2345. The transactions may be enacted due to analyzing or processing the provided service data, and analytical information. For example, analytical information may indicate a home appliance is broken and in need of repair or replacement. A secondary service provider may dispatch a repairman or an e-commerce provider may advertise for a discounted home appliance. In each case, the primary service provider may receive a transaction fee based on the transaction by each secondary service provider.

Another step in the method may be a primary service provider receiving a cross-service fee due to providing cross-service functions to one or more secondary service providers, as shown in block 2350. For example, a primary service provider may detect a home appliance, such as an oven, has been on for a prolonged period of time by collecting data for an energy management service provider. The primary service provider may then alert a premises security service provider of a potential fire hazard. A further step in the method may be a primary service provider receiving e-commerce incentives from e-commerce service providers, as shown in block 2355. For example, the primary service provider may offer advertisements to products offered by preferred e-commerce service providers in exchange for a share of revenue or a fee. An additional step in the method may be a primary service provider providing targeted advertising, as shown in block 2360. For example, the primary service provider may be a cable service provider and may provide targeted advertising for sports content providers to users who have a propensity to view sports programming. Another step in the method may include the primary service provider providing targeted e-commerce services for an e-commerce service provider, as shown in block 2365. For example, the primary server operated by a primary service provider may collect end user data and analytical information from one or more end point devices. Historical data may indicate that parental controls on e-commerce websites are instituted during certain evening hours, however, on a particular day, parental controls were not implemented. The primary service provider, using the primary server, may institute parental controls on the e-commerce website. Such an action may prompted by the e-commerce service provider or performed due to the primary service providers discretion based on processing collected analytical information from the end point devices. Additional steps in the method may be providing cross-service function, as shown in block 2370, as well as providing other functions, as shown in block 2375, as recognized by persons skilled in the art.

In general, it should be understood that the circuits described herein may be implemented in hardware using integrated circuit development technologies, or yet via some other methods, or the combination of hardware and software objects that could be ordered, parameterized, and connected in a software environment to implement different functions described herein. For example, the present application may be implemented using a general purpose or dedicated processor running a software application through volatile or non-volatile memory. Also, the hardware objects could communicate using electrical signals, with states of the signals representing different data.

It should be further understood that this and other arrangements described herein are for purposes of example only. As such, those skilled in the art will appreciate that other arrangements and other elements (e.g. machines, interfaces, functions, orders, and groupings of functions, etc.) can be used instead, and some elements may be omitted altogether according to the desired results. Further, many of the elements that are described are functional entities that may be implemented as discrete or distributed components or in conjunction with other components, in any suitable combination and location.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions, or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

We claim:

1. A system for providing a plurality of services to premises over one or more communication networks, the system comprising:
   (i) one or more secure access nodes having one or more secure access node processors, one or more secure access node storage devices, and one or more secure access node software applications;
   (ii) a primary server coupled to the one or more secure access nodes over one or more communication networks, the primary server having one or more primary server processors, one or more primary server storage devices, and one or more primary server software applications;
   (iii) wherein the primary server provides and controls one or more primary services delivered to an end user using one or more terminal devices through the secure access node;
   (iv) wherein the primary server allows one or more secondary services from one or more secondary servers to be delivered to one or more terminal devices through a secure access node;
   (v) wherein the one or more secure access node software applications and the one or more primary server software applications: (a) generate one or more service virtual networks, wherein each of the one or more service virtual networks provides at least one service; and (b) transfers service data including operational data, end point device analytical query data and secure access node analytical query data, end point device analytical response data and secure access node analytical response data, and end point device reconfiguration data and secure access node reconfiguration data between one or more end point device communication interfaces and one or more server communication interfaces;
   (vi) wherein the one or more software applications in the primary server and one or more software applications in the secure access node: (a) provide the primary server and one or more secondary servers access to one or more terminal devices to deliver one or more primary services and one or more secondary services; (b) control one or more service functions of each primary service and secondary service; (c) generate cross-service functional data from processing service data received from one or more end point devices; and (d) reduce cross-service interference among services including the one or more primary services and one or more secondary services based on the generated cross-service functional data; (e) provide a management function including maintenance, diagnostics and administration; (f) wherein the plurality of services are provided in real-time and are active simultaneously;
   (vii) wherein the cross-service interference among services is reduced by using a service segregation software module in the primary server and secure access nodes based on fuzzy logic rules;
   (viii) wherein the software applications in the service segregation software module use fuzzy logic rules to determine integrity of service messages and service information flowing from a service to other services, and each violation of the fuzzy logic rules is flagged and reported to a primary server's management function;

(ix) wherein the primary server's management function updates the fuzzy logic rules in primary server and one or more secure access nodes based on flagged violation;

(x) wherein the primary service provider and secondary service providers have a revenue sharing arrangement for allowing secondary services to be provided using the software applications in primary server and software applications in one or more secure access nodes.

2. The system of claim 1, wherein the set of services provided by primary service provider and secondary service providers are selected from linear TV, IP TV, Internet TV, whole-home DVR, managed WiFi, IT backup, voice services, skype on TV, browser on TV, video services on smartphone, video services on tablet, energy management, e-education, e-commerce, e-advertisement, tele-medicine and any combination thereof.

3. The system of claim 1, wherein:
the service data including operational data, end point device analytical query data and secure access node analytical query data, end point device analytical response data and secure access node analytical response data is processed using conventional and fuzzy logic removing any unauthorized cross service content and provided to the secondary server;
using the service data the secondary server provides individualized services to the end point devices via the software applications on the primary server, the secure access nodes and end point devices, wherein the primary server supports accounting for transaction based on the individualized services and wherein the accounting results in compensation to the primary service provider.

4. The system of claim 3, wherein compensation includes fees selected from the group consisting fees based on actions taken by the end user based on the secondary services provided, monthly subscription, annual subscription, revenue sharing arrangements between a primary service provider and a secondary service provider, and any combination thereof.

5. The system of claim 4, wherein the actions taken by the end user are from a group consisting of viewing of an advertisement from the secondary service provider, subscribing to a service, inquiring more information from the secondary service provider, conducting service usage from the secondary service provider, conducting e-commerce from the secondary service provider and a combination thereof.

6. The system of claim 5, wherein the actions taken by the end user are used to update the fuzzy logic and other analytical data collected to improve targeting of the set of services.

7. The system of claim 6, wherein the primary service provider compensates a system manufacturer based on fees selected from the group consisting of fees the primary service provider receives from the end user, fees received from the secondary service providers that utilize the primary service provider network, and any combination thereof.

8. A device for providing a plurality of services to premises over one or more communication networks, the device comprising:
(i) one or more device processors, one or more device storage devices, and one or more device software applications;
(ii) one or more communication interfaces coupled to one or more communication networks;
(iii) wherein the device delivers one or more primary services to an end user using one or more terminal devices;
(iv) wherein the device allows one or more secondary services from one or more secondary servers to be delivered to one or more terminal devices;
(v) wherein the one or more device software applications: (a) generate one or more service virtual networks, wherein each of the one or more service virtual networks provides at least one service; and (b) transfers service data including operational data, end point device analytical query data and secure access node analytical query data, end point device analytical response data and secure access node analytical response data, and end point device reconfiguration data and secure access node reconfiguration data between a first communication interface and a second communication interface;
(vi) wherein the one or more device software applications: (a) provide the primary server and one or more secondary servers access to one or more terminal devices to deliver one or more primary services and one or more secondary services; (b) control one or more service functions of each primary service and secondary service; and (c) generate cross-service functional data from processing service data received from one or more end point devices; (d) reduce cross-service interference among services including the one or more primary services and one or more secondary services based on the generated cross-service functional data; (e) provide a management function including maintenance, diagnostics and administration; (f) wherein the plurality of services are provided in real-time and are active simultaneously;
(vii) wherein the cross-service interference among services is reduced by using a service segregation software module in the primary server and secure access nodes based on fuzzy logic rules;
(viii) wherein the software applications in the service segregation software module use fuzzy logic rules to determine integrity of service messages and service information flowing from a service to other services, and each violation of the fuzzy logic rules is flagged and reported to a primary server's management function;
(ix) wherein the device management function updates the fuzzy logic rules in the device based on flagged violation;
(x) wherein the primary service provider and secondary service providers have a revenue sharing arrangement for allowing secondary services to be provided using the device software applications.

9. The device of claim 8, wherein the set of services provided by primary service provider and secondary service providers are selected from linear TV, IP TV, Internet TV, whole-home DVR, managed WiFi, IT backup, voice services, skype on TV, browser on TV, video services on smartphone, video services on tablet, energy management, e-education, e-commerce, e-advertisement, tele-medicine and any combination thereof.

10. The device of claim 8, wherein
the service data including operational data, end point device analytical query data and secure access node analytical query data, end point device analytical response data and secure access node analytical response data processed using via conventional and fuzzy logic removing any unauthorized cross service content and provided to the secondary server;
using the service data the secondary server provides individualized services to the end point devices via the software applications on the primary server, the secure access nodes and end point devices, wherein the primary server supports accounting for the transaction based on the individualized services and wherein the accounting results in compensation to the primary service provider.

11. The device of claim 10, wherein compensation includes fees selected from the group consisting fees based on actions taken by the end user based on the secondary services provided, monthly subscription, annual subscription, revenue sharing arrangements between a primary service provider and a secondary service provider, and any combination thereof.

12. The device of claim 11, wherein the actions taken by the end user are from a group consisting of viewing of an advertisement from the secondary service provider, subscribing to a service, inquiring more information from the secondary service provider, conducting service usage from the secondary service provider, conducting e-commerce from the secondary service provider and a combination thereof.

13. The device of claim 12, wherein the actions taken by the end user are used to update the fuzzy logic and other analytical data collected to improve targeting of the set of services.

14. The device of claim 13, wherein the primary service provider compensates a system manufacturer based on fees selected from the group consisting of fees the primary service provider receives from the end user, fees received from the secondary service providers that utilize the primary service provider network, and any combination thereof.

15. The device of claim 8, wherein the device is selected from the group consisting of a primary server and a secure access node.

16. A method for providing a plurality of services to premises over one or more communication networks, the method comprising:
   (i) providing and controlling one or more primary services, by a primary server, delivered to an end user using one or more terminal devices through the secure access node;
   (ii) allowing, by a primary server, one or more secondary services from one or more secondary servers to be delivered to one or more terminal devices through a secure access node;
   (iii) generating one or more service virtual networks, wherein each of the one or more service virtual networks provides at least one service by a primary server or one or more secure access nodes;
   (iv) transferring service data including operational data, end point device analytical query data and secure access node analytical query data, end point device analytical response data and secure access node analytical response data, and end point device reconfiguration data and secure access node reconfiguration data between one or more end point device communication interfaces and one or more server communication interfaces by a primary server or one or more secure access nodes;
   (v) providing the primary server and one or more secondary servers access to one or more terminal devices to deliver one or more primary services and one or more secondary services by a primary server or one or more secure access nodes;
   (vi) controlling one or more service functions of each primary service and secondary service by a primary server or one or more secure access nodes;
   (vii) generating cross-service functional data from processing service data received from one or more end point devices;
   (viii) reducing cross-service interference among services including the one or more primary services and one or more secondary services by a primary server or one or more secure access nodes based on the generated cross-service functional data;
   (ix) providing a management function including maintenance, diagnostics and administration by the primary server wherein the plurality of services are provided in real-time and are active simultaneously;
   (x) wherein the cross-service interference among services is reduced by using a service segregation software module in the primary server and secure access node based on fuzzy logic rules;
   (xi) wherein the software applications in the service segregation software module use fuzzy logic rules to determine integrity of service messages and service information flowing from a service to other services, and each violation of the fuzzy logic rules is flagged and reported to a primary server's management function;
   (xii) wherein the primary server's management function updates the fuzzy logic rules in primary server and one or more secure access nodes based on flagged violation;
   (xiii) wherein the primary service provider and secondary service providers have a revenue sharing arrangement for allowing secondary services to be provided using the software applications in primary server and software applications in one or more secure access nodes.

17. The method of claim 16, wherein the set of services provided by primary service provider and secondary service providers are selected from linear TV, IP TV, Internet TV, whole-home DVR, managed WiFi, IT backup, voice services, skype on TV, browser on TV, video services on smartphone, video services on tablet, energy management, e-education, e-commerce, e-advertisement, tele-medicine and any combination thereof.

18. The method of claim 16, wherein
the service data including operational data, end point device analytical query data and secure access node analytical query data, end point device analytical response data and secure access node analytical response data is processed using conventional and fuzzy logic removing any unauthorized cross service content and provided to the secondary server;
using the service data the secondary server provides individualized services to the end point devices via the software applications on the primary server, the secure access nodes and end point devices, wherein the primary server supports accounting for the transaction based on the individualized services and wherein the accounting results in compensation to the primary service provider.

19. The method of claim 18, wherein compensation includes fees selected from the group consisting fees based on actions taken by the end user based on the secondary services provided, monthly subscription, annual subscription, revenue sharing arrangements between a primary service provider and a secondary service provider, and any combination thereof.

20. The method of claim 19, wherein the actions taken by the end user are from a group consisting of viewing of an advertisement from the secondary service provider, subscribing to a service, inquiring more information from the secondary service provider, conducting service usage from the secondary service provider or conducting e-commerce from the secondary service provider and a combination thereof.

21. The method of claim 20, wherein the actions taken by the end user are used to update the fuzzy logic and other analytical data collected to improve targeting of the set of services.

22. The method of claim 21, wherein the primary service provider compensates a system manufacturer based on fees selected from the group consisting of fees the primary service provider receives from the end user, fees received from the secondary service providers that utilize the primary service provider network, and any combination thereof.

\* \* \* \* \*